(12) United States Patent
Shimomura

(10) Patent No.: US 9,405,105 B2
(45) Date of Patent: Aug. 2, 2016

(54) ZOOM LENS SYSTEM AND IMAGE PICKUP APPARATUS INCLUDING THE SAME

(71) Applicant: CANON KABUSHIKI KAISHA, Tokyo (JP)

(72) Inventor: Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/468,673

(22) Filed: Aug. 26, 2014

(65) Prior Publication Data

US 2014/0362450 A1     Dec. 11, 2014

Related U.S. Application Data

(63) Continuation of application No. 13/187,040, filed on Jul. 20, 2011, now Pat. No. 8,842,371.

(30) Foreign Application Priority Data

Jul. 26, 2010 (JP) .................................. 2010-167032

(51) Int. Cl.
*G02B 15/04* (2006.01)
*G02B 15/163* (2006.01)
(Continued)

(52) U.S. Cl.
CPC ................ *G02B 15/04* (2013.01); *G02B 15/06* (2013.01); *G02B 15/163* (2013.01); *G02B 15/24* (2013.01)

(58) Field of Classification Search
CPC ........ G02B 15/02; G02B 15/04; G02B 15/10; G02B 15/12; G02B 15/163; G02B 15/24

USPC .................................. 359/672, 674–676, 683
See application file for complete search history.

(56) References Cited

U.S. PATENT DOCUMENTS 5,097,360 A    3/1992  Fukami et al.
5,745,298 A *  4/1998  Yahagi .................. G02B 15/17
                                                      359/674
(Continued)

FOREIGN PATENT DOCUMENTS

JP         2009098419 A    5/2009

OTHER PUBLICATIONS

Notice of Allowance issued in parent U.S. Appl. No. 13/187,040, dated Jan. 14, 2013.

(Continued)

*Primary Examiner* — Jordan Schwartz
(74) *Attorney, Agent, or Firm* — Rossi, Kimms & McDowell LLP

(57) ABSTRACT

Provided is a zoom lens including a focus lens portion, a zoom portion, an aperture stop, and a relay portion that does not move for zooming but comprises a negative fourth-first unit, a fourth-second unit interchangeable for an optical path, a positive fourth-third unit, and a fourth-fourth unit insertable for the optical path for shifting a focal length range of an entire system to a long focal length side after removing the fourth-second unit from the optical path, and a distance on an optical axis between the aperture stop and a last lens surface of the fourth-fourth unit in a state of inserting the fourth-fourth unit in the optical path, a distance on the optical axis between a first lens surface and the last lens surface of the fourth-fourth unit, and an aperture diameter in an opened state of the aperture stop satisfy a predetermined conditions.

9 Claims, 15 Drawing Sheets

(51) Int. Cl.
*G02B 15/24* (2006.01)
*G02B 15/06* (2006.01)

(56) References Cited

U.S. PATENT DOCUMENTS 6,965,481 B2 11/2005 Tomita et al.
7,580,199 B2 8/2009 Yakita
2005/0225876 A1* 10/2005 Nurishi ............... G02B 13/08
359/716
2007/0058264 A1 3/2007 Yakita
2010/0302649 A1 12/2010 Yoshimi et al.

OTHER PUBLICATIONS

Notice of Allowance issued in parent U.S. Appl. No. 13/187,040, dated May 22, 2014.

* cited by examiner

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the same, which are suitable for a broadcast television camera, a video camera, a digital still camera, a silver halide camera, and the like.

2. Description of the Related Art

In recent years, a zoom lens system having a high zoom ratio and high optical performance has been demanded for an image pickup apparatus such as a television camera. As a method of realizing a high zoom ratio, there is known a built-in extender system. In the built-in extender system, a partial system constituting a relay portion that constitutes the zoom lens system and is fixed for zooming is removed from the optical path, and an extender is inserted in place of the partial system, to thereby shift a focal length range of the entire system.

For instance, there is known a four-unit zoom lens system including a first lens unit for focusing, a second lens unit for varying magnification, a third lens unit for correcting image plane variation, and a fourth lens unit (relay portion) for imaging that includes a lens unit exchangeable with an extender (see U.S. Pat. No. 5,097,360 or Japanese Patent Application Laid-Open No. 2009-098419). In this zoom lens system disclosed in U.S. Pat. No. 5,097,360 or Japanese Patent Application Laid-Open No. 2009-098419, the fourth lens unit is constituted of a fourth-first unit having negative optical power, a fourth-second unit that is insertable into and removable from the optical path, and a fourth-third unit having positive optical power. In this case, the fourth-second unit is exchanged with the extender so as to shift a focal length range of the entire system.

The zoom lens system that is used for an image pickup apparatus such as a television camera or a video camera is required to have a high zoom ratio and high optical performance, and further, the entire system is required to be small and light. In general, in the built-in extender system, it is necessary to secure a space having a predetermined length in the optical axis direction for inserting and removing the extender in the relay portion. For this reason, the entire length of the relay portion is apt to increase. In order to suppress the increase in the entire length of the relay portion, it is effective to reduce a length of the extender in the optical axis direction.

When the extender, which causes the focal length range of the entire system to shift to a long focal length side, is inserted in the optical path, an exit ray height from the extender is required to be smaller than an incident ray height to the extender. Therefore, in general, the extender is constituted of a front unit having positive optical power and a rear unit having negative optical power. In order to decrease the entire length of the extender, it is necessary to increase positive optical power of the front unit and to increase negative optical power of the rear unit. In general, if the front unit and the rear unit are constituted to have such large optical power, not only an absolute amount of aberration but also high order aberration increases. As a result, it becomes difficult to correct for aberration.

FIGS. 14A and 14B are explanatory diagrams of the four-unit zoom lens system in the case where a ray enters the fourth-first unit having negative optical power constituting a relay portion in a converging manner, and exits from the same in a diverging manner. FIG. 14A is a schematic diagram in which the fourth-second unit is a standard lens unit and the focal length range of the entire system is in a standard state. FIG. 14B is a schematic diagram in which a fourth-fourth unit is an extender and the focal length range of the entire system is shifted to the long focal length side as an extender switched state. When the ray exits from the fourth-first unit in a diverging manner, the incident ray height to the fourth-fourth unit becomes large. Therefore, as illustrated in FIG. 14B, it is necessary to increase a degree of decreasing the exit ray height with respect to the incident ray height to the fourth-fourth unit. Therefore, it is inevitable to increase the optical powers of the front unit and the rear unit constituting the fourth-fourth unit (extender). On the contrary, if the optical power of each unit is decreased, it is difficult to reduce the entire length of the fourth-fourth unit.

FIGS. 15A and 15B are explanatory diagrams of the four-unit zoom lens system in the case where a ray enters the fourth-first unit having negative optical power constituting the relay portion in a converging manner, and exits from the same in a converging manner. FIG. 15A is a schematic diagram in which the fourth-second unit is the standard lens unit and the focal length range of the entire system is in the standard state. FIG. 15B is a schematic diagram in which the fourth-fourth unit is an extender and the focal length range of the entire system is shifted to the long focal length side as the extender switched state.

If the ray exits from the fourth-first unit in a converging manner, the incident ray height to the fourth-fourth unit becomes small. Therefore, as illustrated in FIG. 15B, in the extender switched state, a degree of decreasing the exit ray height with respect to the incident ray height to the fourth-fourth unit is small. Therefore, it is advantageous for decreasing the entire length of the fourth-fourth unit. However, as illustrated in FIG. 15A, in the standard state, a degree of increasing the exit ray height with respect to the incident ray height to the fourth-second unit is large. Therefore, the optical power of the fourth-second unit becomes large, which makes it difficult correct for aberration in the standard state of the focal length range of the entire system. As described above, in order to secure high optical performance while reducing the entire length of the fourth-fourth unit (extender), it is necessary to appropriately set lens structures of the relay portion and the extender.

SUMMARY OF THE INVENTION

A zoom lens system according to the present invention includes, in order from an object side to an image side: a focus lens portion, a zoom portion including a lens unit that moves for zooming, a relay portion that does not move for zooming, and an aperture stop for light amount adjustment disposed between the zoom portion and the relay portion, in which: the relay portion includes, in order from the object side to the image side, a fourth-first unit having negative optical power, a fourth-second unit that can enter into and exit from an optical path, a fourth-third unit having positive optical power, and a fourth-fourth unit that is inserted in the optical path for shifting a focal length range of an entire system to a long focal length side in a state that the fourth-second unit is removed from the optical path, and when a distance on an optical axis between the aperture stop and a last lens surface of the fourth-fourth unit in a state in which the fourth-fourth unit is inserted in the optical path is denoted by l_out, a distance on the optical axis between a first lens surface and the last lens surface of the fourth-fourth unit is denoted by l_ex, and an aperture diameter in an opened state of the aperture stop is denoted by ea_sp, the following expressions are satisfied:

$$1.25 < l\_out/ea\_sp < 1.38; \text{ and}$$

$$0.40 < l\_ex/l\_out < 0.55.$$

Further, the image pickup apparatus according to the present invention includes; a zoom lens system, and a solid state image pickup element for receiving an image formed by the zoom lens system, in which; the zoom lens system includes, in order from an object side to the solid state image pickup element side; a focus lens portion, a zoom portion including a lens unit that moves for zooming, a relay portion that does not move for zooming, and an aperture stop for light amount adjustment disposed between the zoom portion and the relay portion, the relay portion includes, in order from the object side to the solid state image pickup element side, a fourth-first unit having negative optical power, a fourth-second unit that can enter into and exit from an optical path, a fourth-third unit having positive optical power, and a fourth-fourth unit that is inserted in the optical path for shifting a focal length range of an entire system to a long focal length side in a state that the fourth-second unit is removed from the optical path, and when a distance on an optical axis between the aperture stop and a last lens surface of the fourth-fourth unit in a state in which the fourth-fourth unit is inserted in the optical path is denoted by l_out, a distance on the optical axis between a first lens surface and the last lens surface of the fourth-fourth unit is denoted by l_ex, and an aperture diameter in an opened state of the aperture stop is denoted by ea_sp, the following expressions are satisfied:

$1.25 < l\_out/ea\_sp < 1.38$; and $0.40 < l\_ex/l\_out < 0.55$.

Further features of the present invention will become apparent from the following description of exemplary embodiments with reference to the attached drawings.

DESCRIPTION OF THE EMBODIMENTS

An object of the present invention is to solve the problem described above. Therefore, it is an object of the present invention to provide a zoom lens system and an image pickup apparatus including the same, in which an increase in the entire length of a relay portion is suppressed while obtaining high optical performance in a standard state and in an extender switched state, by appropriately setting lens structures of the relay portion and an extender.

Hereinafter, exemplary embodiments of the present invention are described in detail with reference to the attached drawings. A zoom lens system of the present invention includes, in order from an object side to an image side, a focus lens portion, a zoom portion including a lens unit for zooming, an aperture stop for light amount adjustment, and a relay portion (fourth unit) that does not move for zooming. The relay portion is constituted of a fourth-first unit having negative optical power, a fourth-second unit that is removable from (that can enter into and exit from) the optical path, and a fourth-third unit having positive optical power. The relay portion includes a fourth-fourth unit that is inserted in the optical path in place of the fourth-second unit after the fourth-second unit is removed from the optical path so that the focal length range of the entire system is increased (shifted to a long focal length side). Here, the fourth-fourth unit is inserted in the same place where the fourth-second unit was disposed. In addition, it is desirable that the focal length of the entire system become 1.5 times or larger (preferably twice or larger) in the case where the fourth-fourth unit is inserted in the optical path than in the case where the fourth-second unit is disposed in the optical path. In addition, there may be a case where both the fourth-second unit and the fourth-fourth unit are not disposed in the optical path.

Here, the fourth-first unit (lens unit of the relay portion that is disposed closest to the object side) can be moved in a direction perpendicular to the optical axis (may be moved in a diagonal direction to the optical axis). In this embodiment, based on a detection result of a vibration sensor (acceleration sensor or displacement sensor) or the like (not shown), the fourth-first unit is moved in the direction perpendicular to the optical axis so that a position of the image formed by the zoom lens system is shifted in the direction perpendicular to the optical axis. Thus, image vibration (blur) due to zoom lens vibration (shake) is reduced.

Figure 1A:
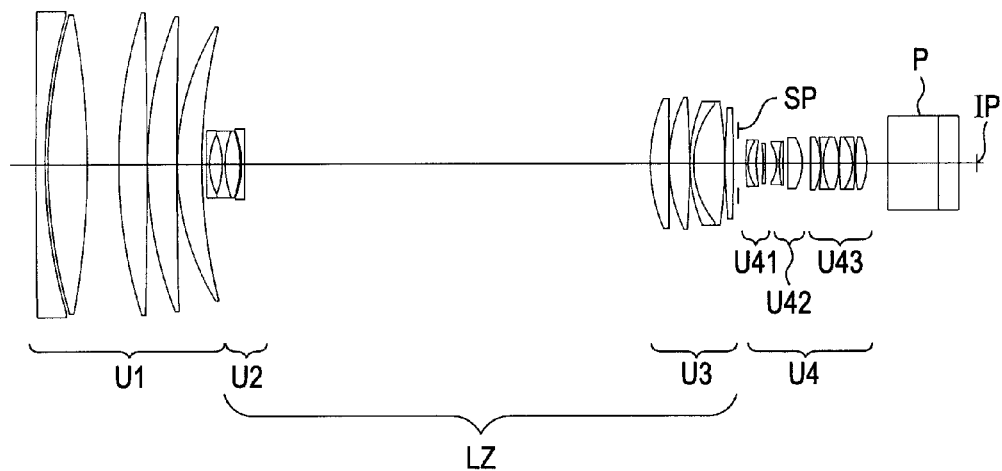
FIGS. 1A and 1B are lens cross sectional views at a wide angle end according to Numerical Embodiment 1 in a standard state and in an extender switched state, respectively.
Figure 1B:
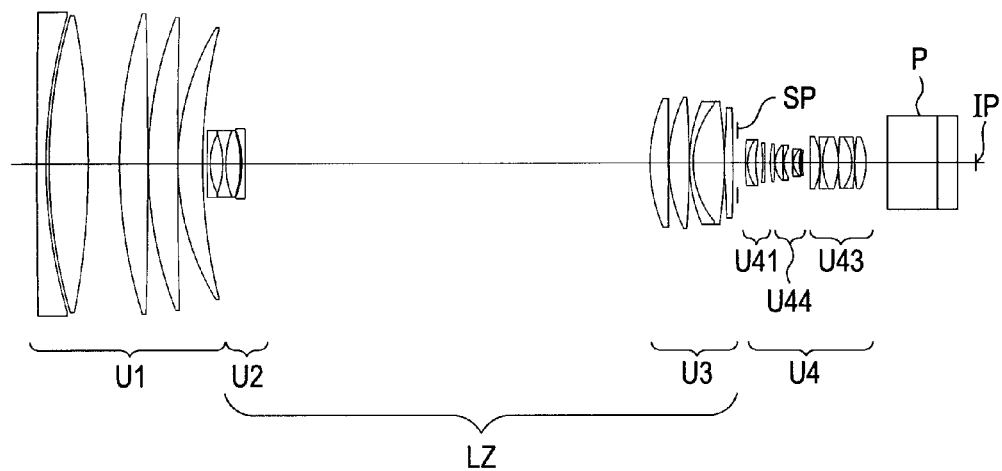

FIGS. 1A and 1B are lens cross sectional views at a wide angle end according to Embodiment 1 of the present invention in a standard state and in a state in which the focal length range of the entire system is shifted to the longer side (extender switched state), respectively. Here, the standard state refers to the state in which the standard lens unit (fourth-second unit) is disposed in the optical path of the relay portion. The extender switched state refers to the state in which the extender (fourth-fourth unit) is disposed in place of the standard lens unit in the optical path of the relay portion. The same is true in the following description.

Figure 2A:
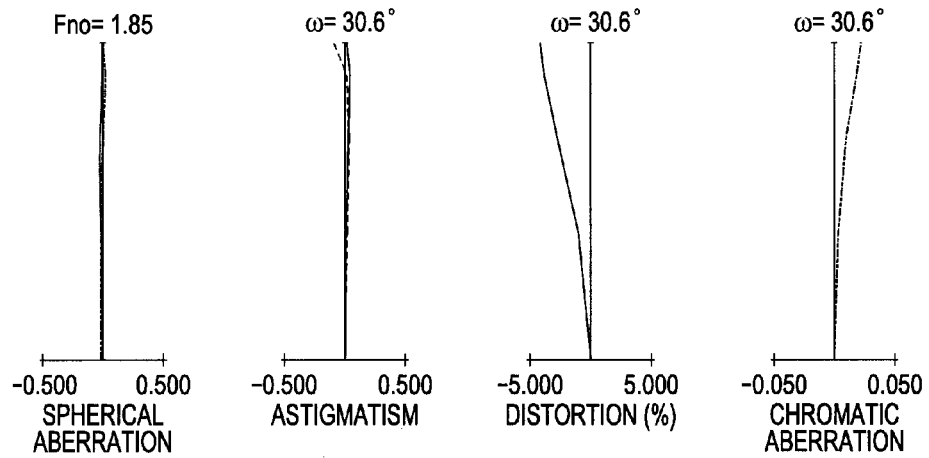
FIGS. 2A, 2B, and 2C are longitudinal aberration diagrams in the standard state at individual zoom positions according to Numerical Embodiment 1.
Figure 2B:
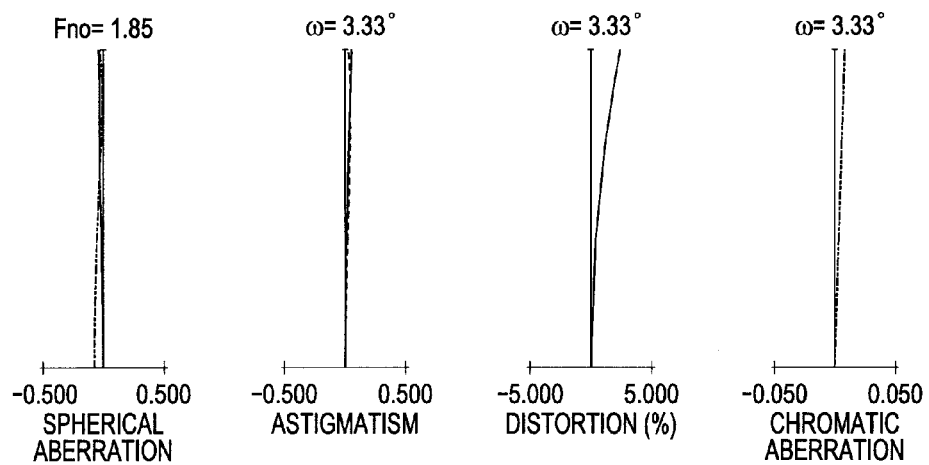
Figure 2C:
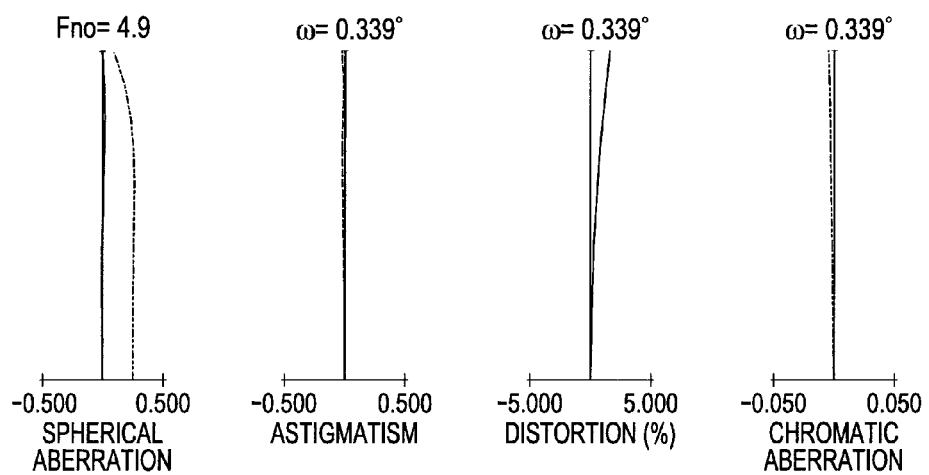
Figure 3A:
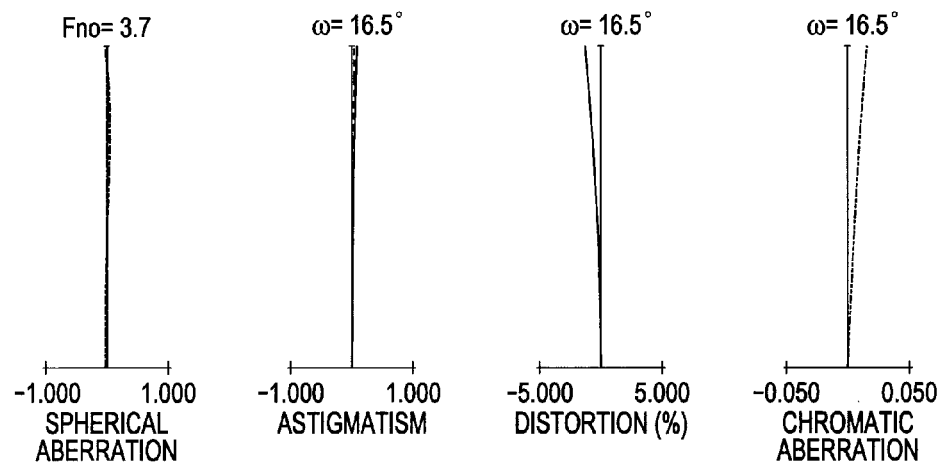
FIGS. 3A, 3B, and 3C are longitudinal aberration diagrams in the extender switched state at individual zoom positions according to Numerical Embodiment 1.
Figure 3B:
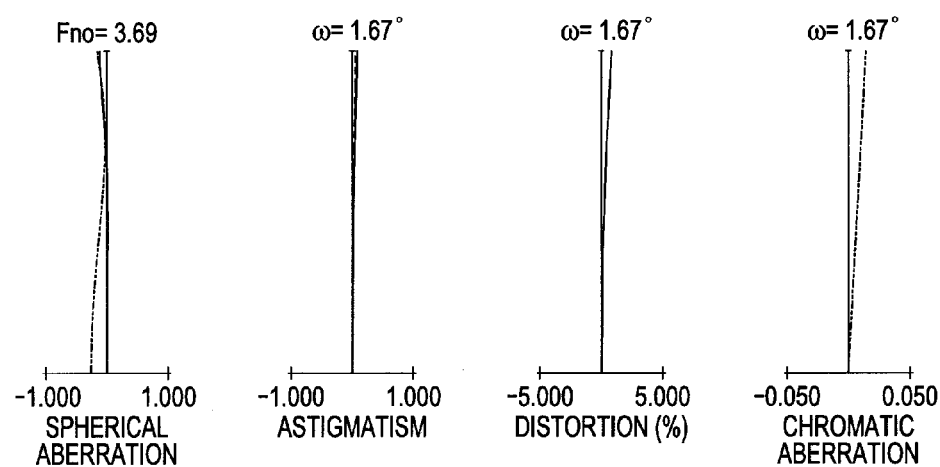
Figure 3C:
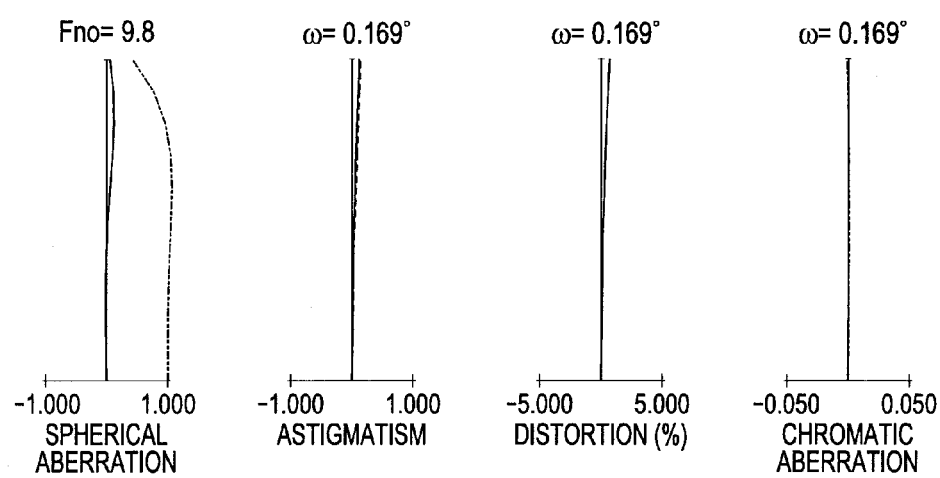

FIGS. 2A, 2B, and 2C are longitudinal aberration diagrams in the standard state according to Embodiment 1 of the present invention, at the wide angle end (short focal length end), at a focal length of 94.44 mm, and at a telephoto end (long focal length end), respectively. Here, the value of the focal length is a value obtained when numerical embodiments described later are expressed by unit of millimeters. In addition, the aberration diagram indicates the state in which an object distance (distance from a first lens surface) is 13 m. The same is true in the following embodiments. FIGS. 3A, 3B, and 3C are longitudinal aberration diagrams in the extender switched state according to Embodiment 1 of the present invention, at the wide angle end, at a focal length of 188.88 mm, and at the telephoto end, respectively.

Figure 4A:
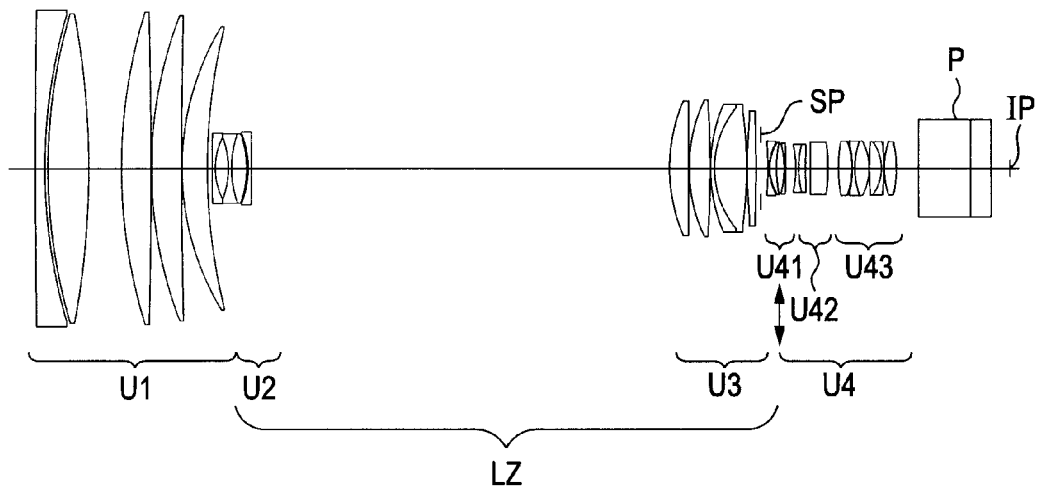
FIGS. 4A and 4B are lens cross sectional views at a wide angle end according to Numerical Embodiment 2 in the standard state and in the extender switched state, respectively.
Figure 4B:
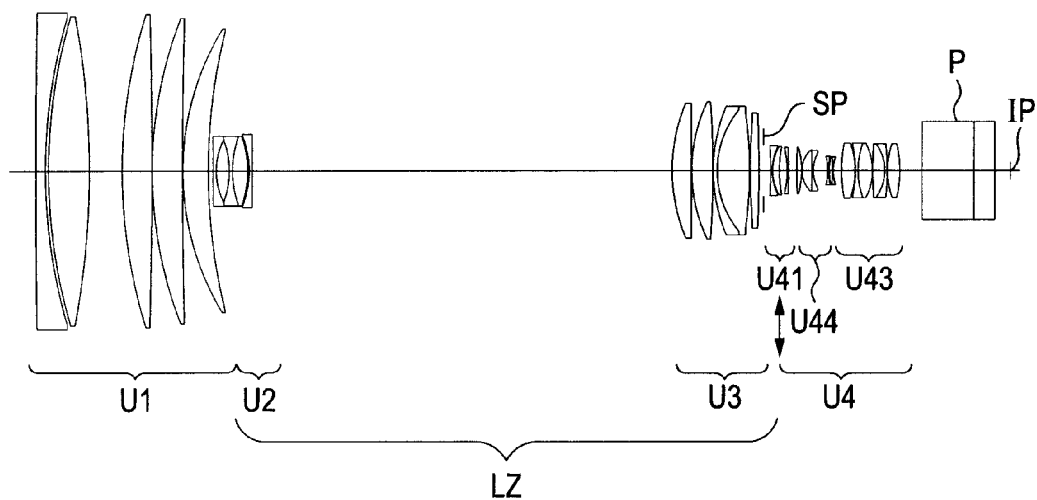
Figure 5A:
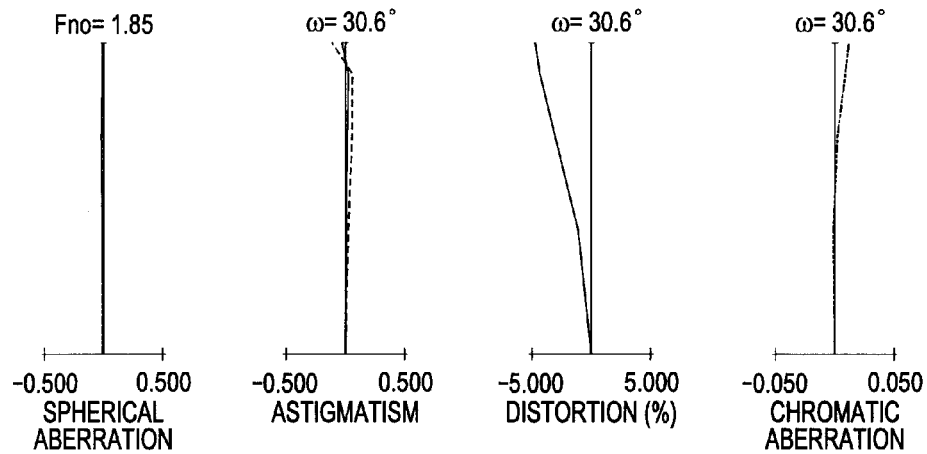
FIGS. 5A, 5B, and 5C are longitudinal aberration diagrams in the standard state at individual zoom positions according to Numerical Embodiment 2.
Figure 5B:
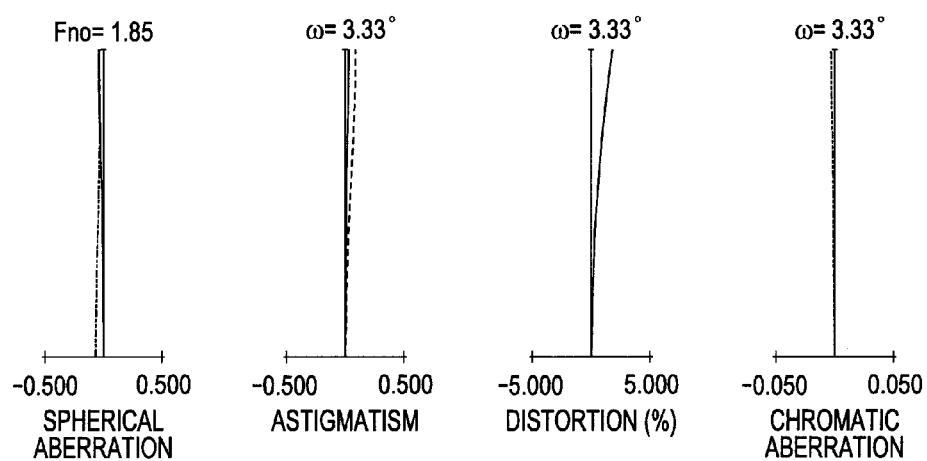
Figure 5C:
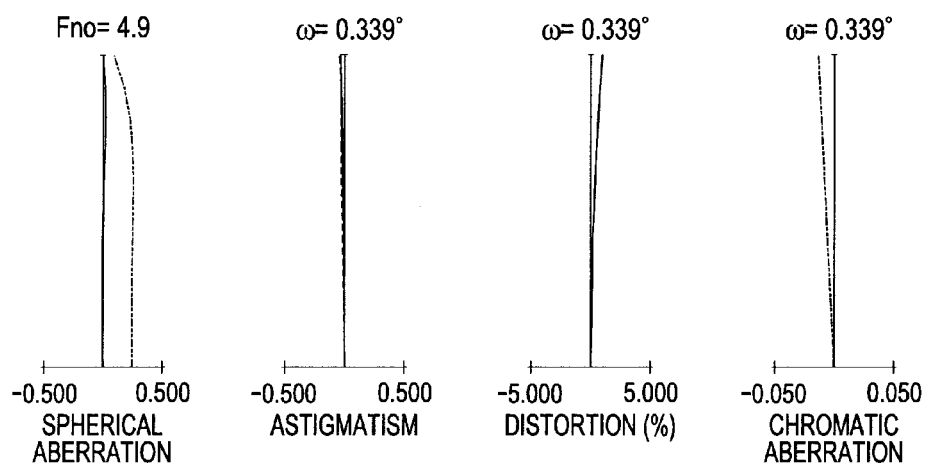
Figure 6A:
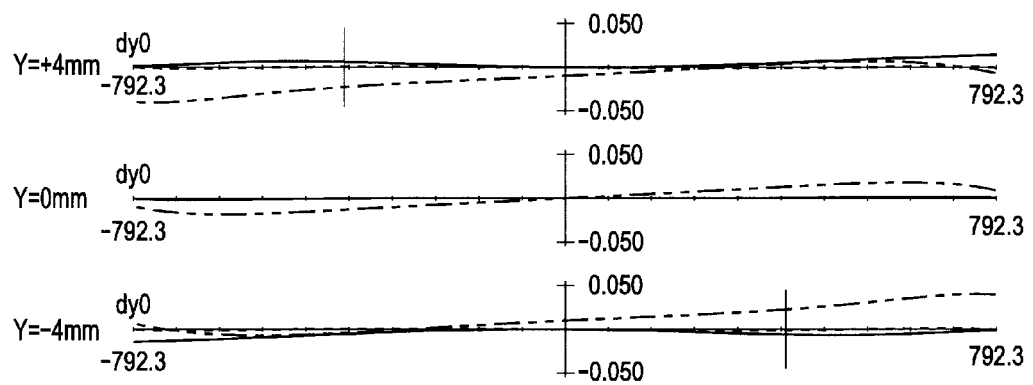
FIGS. 6A and 6B are lateral aberration diagrams at a telephoto end in the standard state according to Numerical Embodiment 2, in the case where image stabilization is not performed and in the case where the image stabilization is performed, respectively.
Figure 6B:
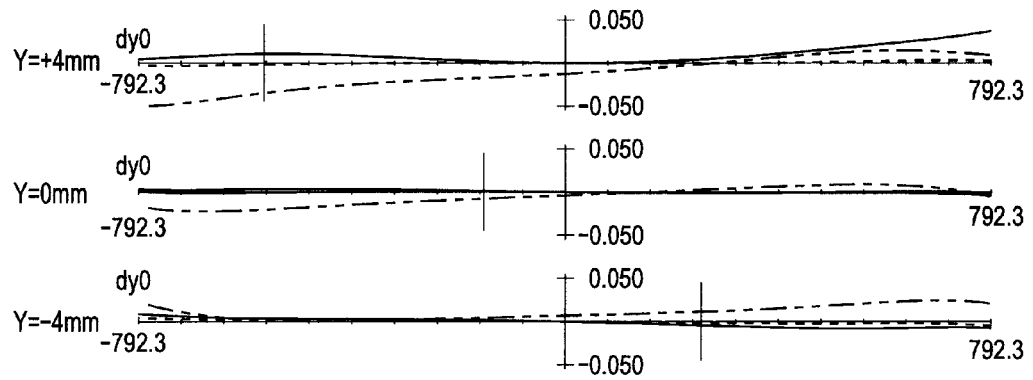
Figure 7A:
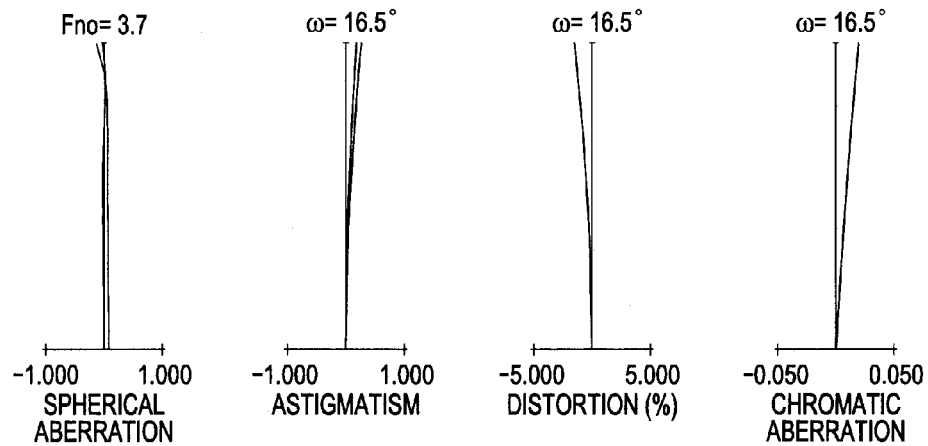
FIGS. 7A, 7B, and 7C are longitudinal aberration diagrams in the extender switched state at individual zoom positions according to Numerical Embodiment 2.
Figure 7B:
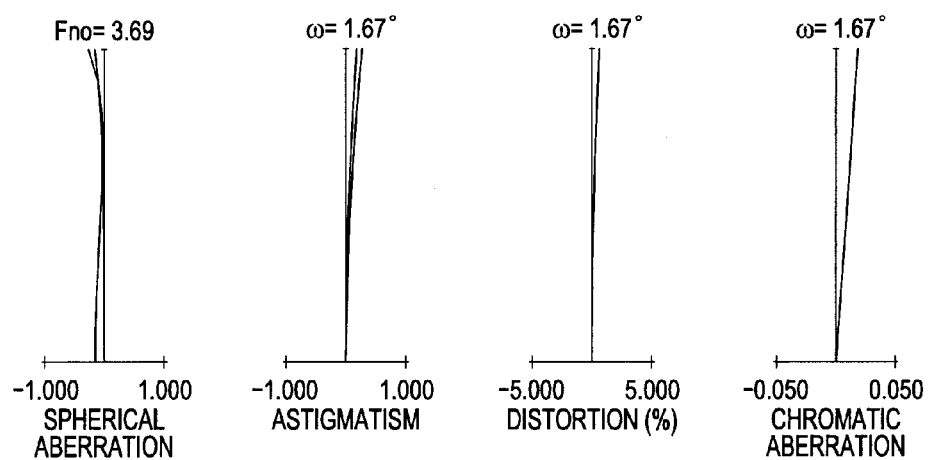
Figure 7C:
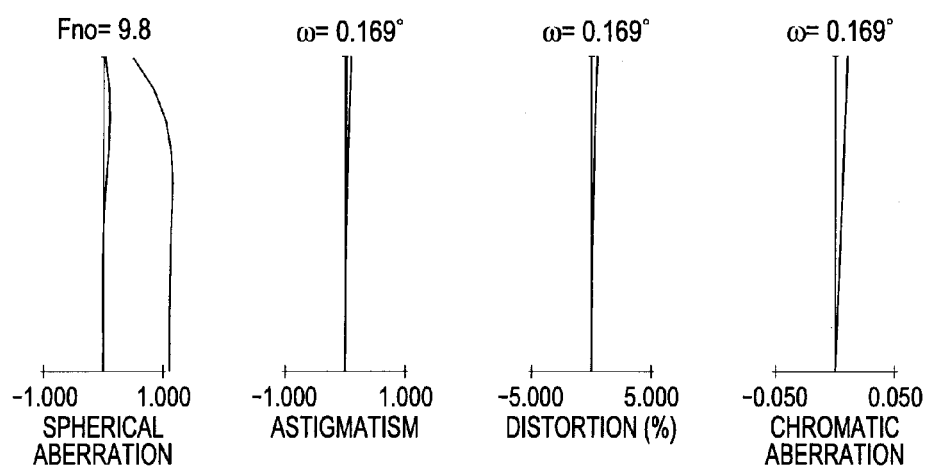

FIGS. 4A and 4B are lens cross sectional views at a wide angle end according to Embodiment 2 of the present invention in the standard state and in the state in which the focal length range of the entire system is shifted to the longer side (extender switched state), respectively. FIGS. 5A, 5B, and 5C are longitudinal aberration diagrams in the standard state according to Embodiment 2 of the present invention at the wide angle end, at a focal length of 94.44 mm, and at the telephoto end, respectively. FIGS. 6A and 6B are lateral aberration diagrams at a telephoto end in the standard state according to Embodiment 2 of the present invention, and in the state in which a fourth-first unit U41 for image stabilization is decentered by 1.4 mm in the direction perpendicular to the optical axis at the telephoto end in the standard state, respectively. FIGS. 7A, 7B, and 7C are longitudinal aberration diagrams in the extender switched state according to Embodiment 2 of the present invention, at the wide angle end, at a focal length of 188.88 mm, and at the telephoto end, respectively.

Figure 8A:
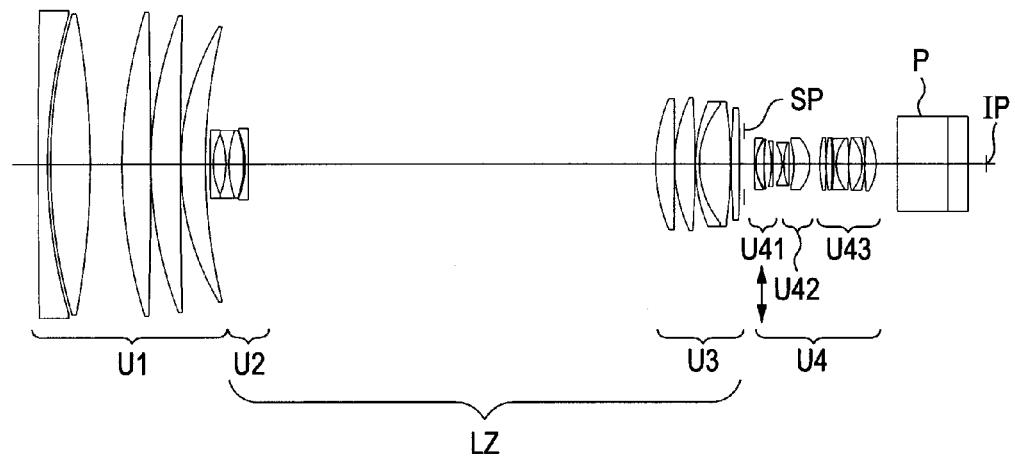
FIGS. 8A and 8B are lens cross sectional views at a wide angle end according to Numerical Embodiment 3 in the standard state and in the extender switched state, respectively.
Figure 8B:
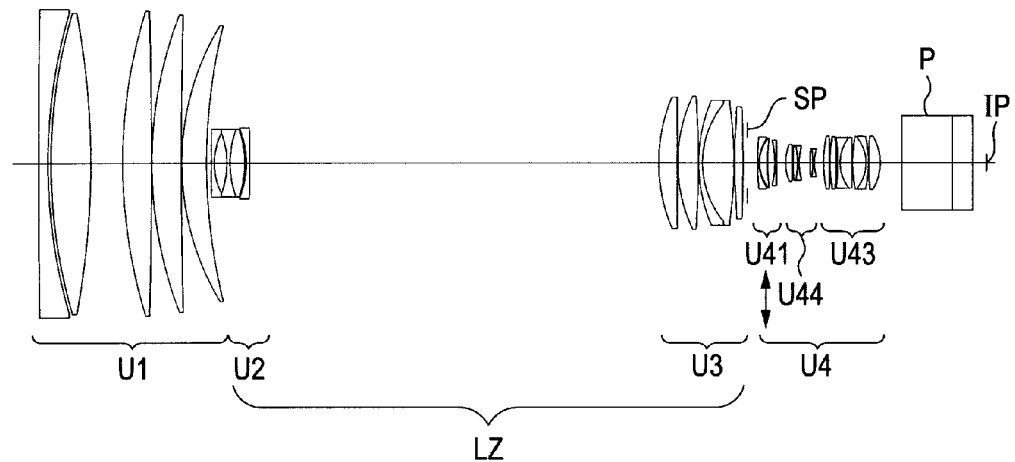
Figure 9A:
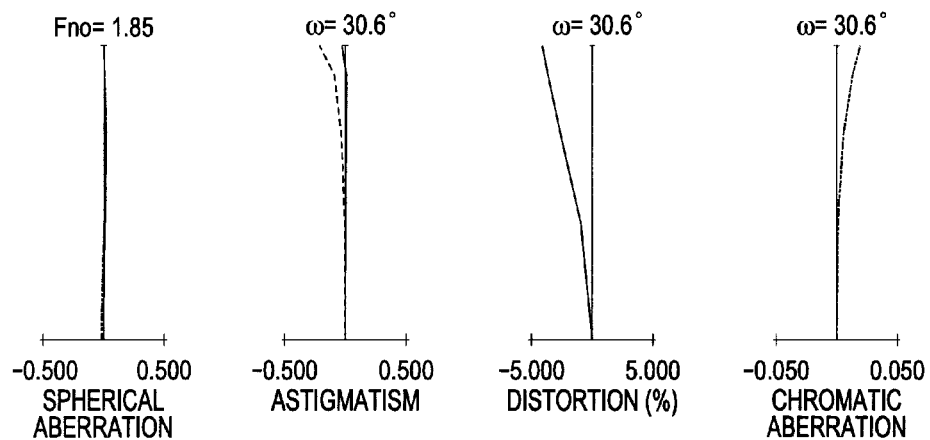
FIGS. 9A, 9B, and 9C are longitudinal aberration diagrams in the standard state at individual zoom positions according to Numerical Embodiment 3.
Figure 9B:
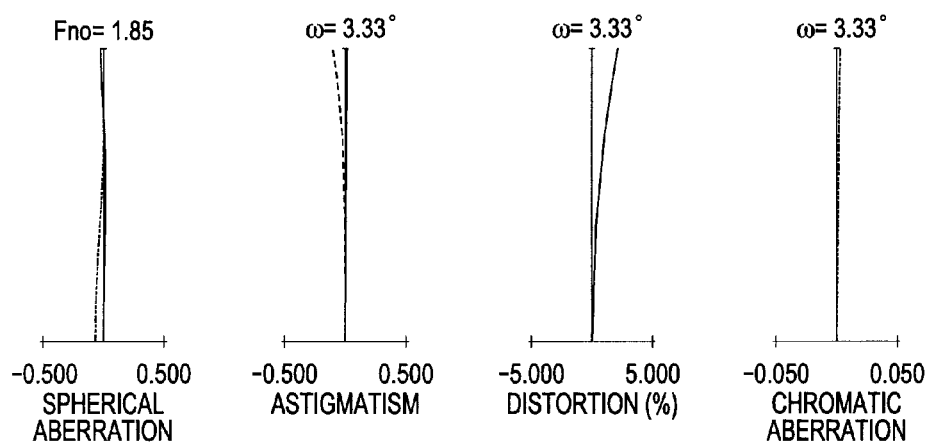
Figure 9C:
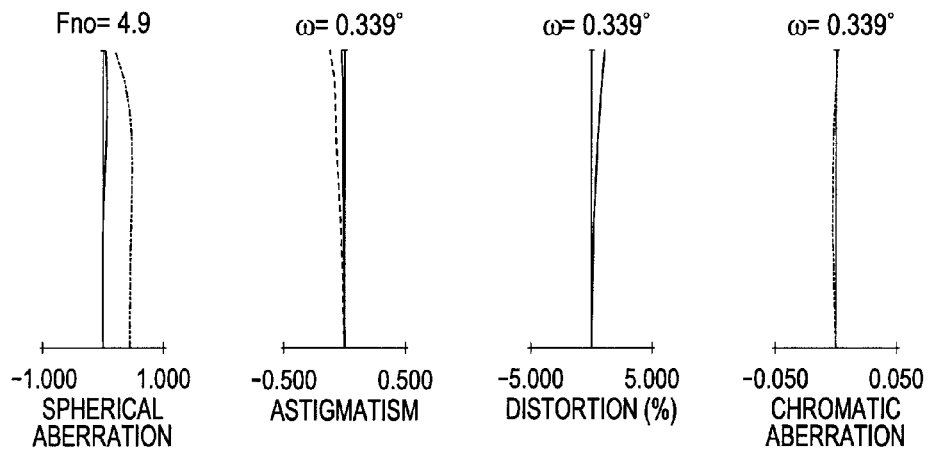
Figure 10A:
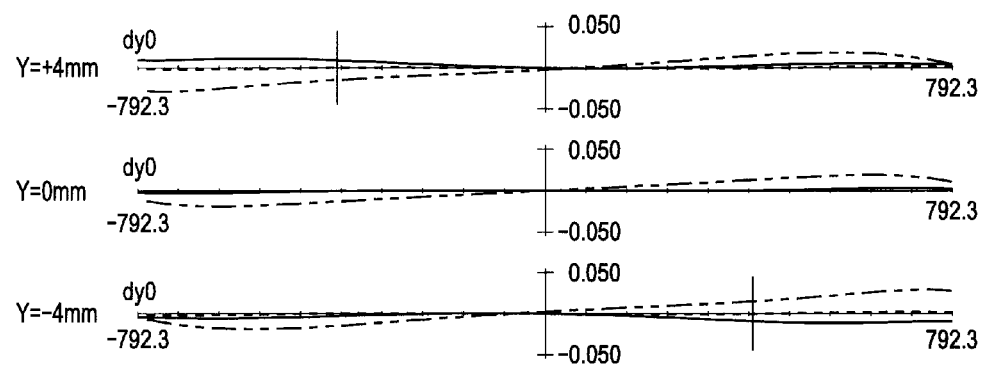
FIGS. 10A and 10B are lateral aberration diagrams at a telephoto end in the standard state according to Numerical Embodiment 3, in the case where the image stabilization is not performed and in the case where the image stabilization is performed, respectively.
Figure 10B:
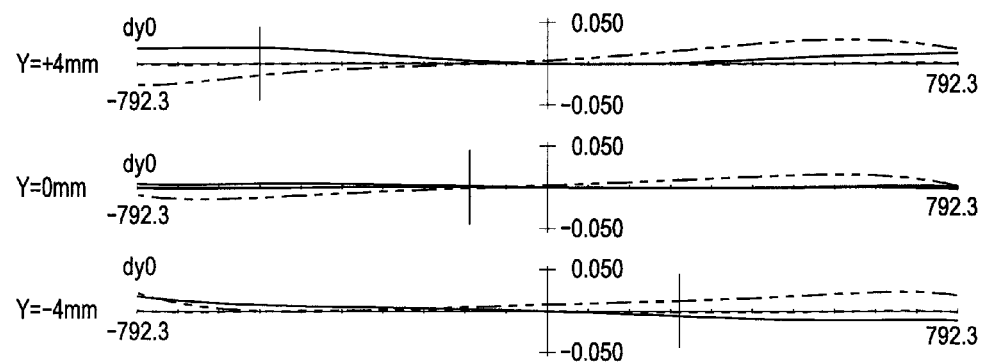
Figure 11A:
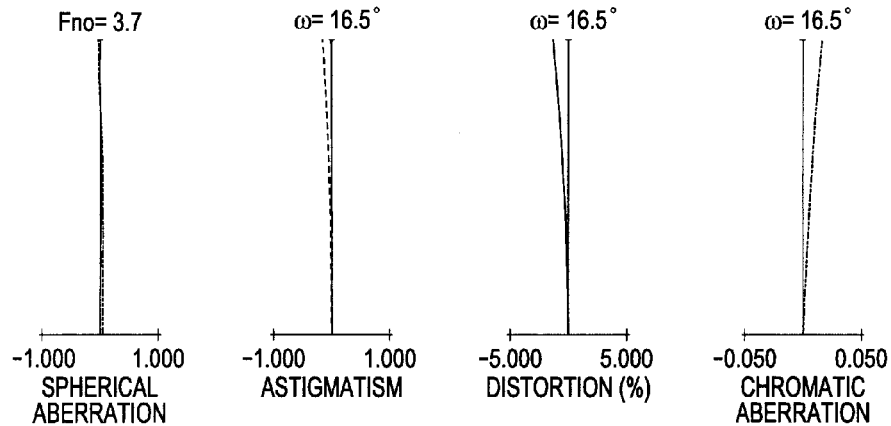
FIGS. 11A, 11B, and 11C are longitudinal aberration diagrams in the extender switched state at individual zoom positions according to Numerical Embodiment 3.
Figure 11B:
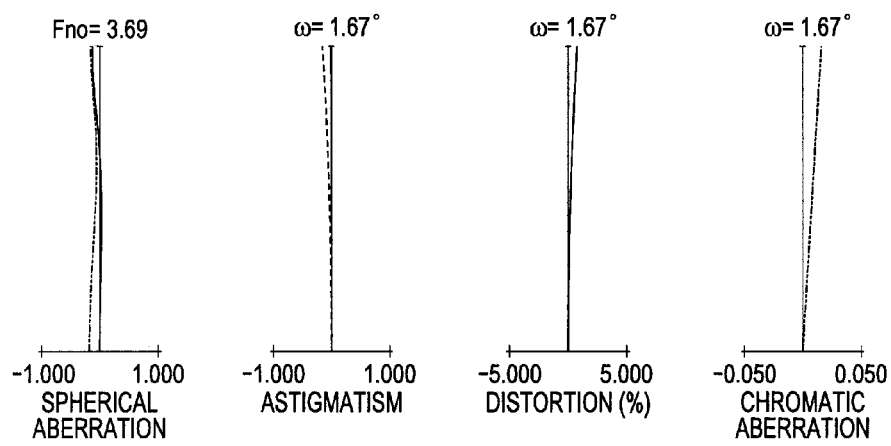
Figure 11C:
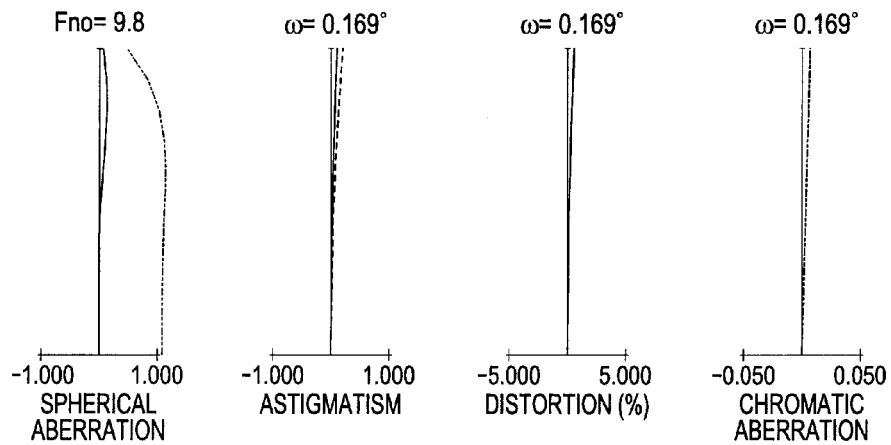
Figure 12:
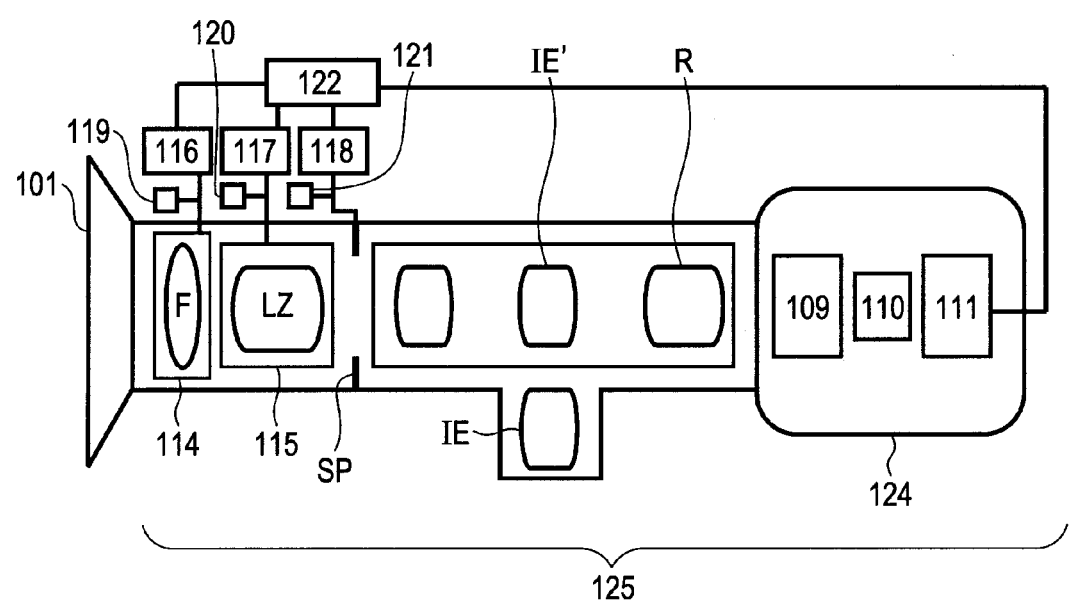
FIG. 12 is a schematic diagram of an image pickup apparatus according to the present invention.

FIGS. 8A and 8B are lens cross sectional views at a wide angle end according to Embodiment 3 of the present invention in the standard state and in the state in which the focal length range of the entire system is shifted to the longer side (extender switched state), respectively. FIGS. 9A, 9B, and 9C are longitudinal aberration diagrams in the standard state according to Embodiment 3 of the present invention, at the wide angle end, at a focal length of 94.44 mm, and at the telephoto end, respectively. FIGS. 10A and 10B are lateral aberration diagrams at a telephoto end in the standard state according to Embodiment 3 of the present invention, and in the state in which the fourth-first unit U41 for image stabilization is decentered by 1.9 mm in the direction perpendicular to the optical axis at the telephoto end in the standard state, respectively. FIGS. 11A, 11B, and 11C are longitudinal aberration diagrams in the extender switched state according to Embodiment 3 of the present invention, at the wide angle end, at a focal length of 188.88 mm, and at the telephoto end, respectively. FIG. 12 is a schematic diagram illustrating a main part of an image pickup apparatus including the zoom lens system according to the present invention.

In the lens cross sectional view, the zoom lens system includes a first lens unit (focus lens portion) U1 having positive optical power that does not move for zooming. The first lens unit U1 performs focusing by moving a whole or a part of a lens unit having optical power. The zoom lens system further includes a zoom portion LZ including the lens unit for zooming. The zoom portion LZ includes a second lens unit (variator lens unit) U2 having negative optical power that moves linearly to the image side for zooming from the wide angle end to the telephoto end. Further, zoom portion LZ includes a third lens unit (compensator lens unit) U3 having positive optical power that moves nonlinearly to the object side so as to correct variation of an image plane position due to magnification varying. The third lens unit U3 moves on the optical axis together with the second lens unit U2 in the magnification varying from the wide angle end to the telephoto end.

The zoom lens system further includes an aperture stop SP which is disposed on the image side of the third lens unit U3, and a fourth lens unit (relay lens unit) (relay portion) U4 having positive optical power for imaging that does not move for zooming. The relay portion U4 is constituted of the fourth-first unit U41 having negative optical power, a fourth-second unit U42 that can enter into and exit from the optical path, and a fourth-third unit U43 having positive optical power. The zoom lens system further includes a fourth-fourth unit (extender) U44 which is inserted in place of the fourth-second unit U42 in the optical path after the fourth-second unit U42 is removed from the optical path so that the focal length range of the entire system is shifted to the long focal length side. The zoom lens system further includes a color separation prism or an optical filter P which is indicated as a glass block, and an image plane IP, which corresponds to an image plane of a solid state image pickup element (photoelectrical conversion element).

In each longitudinal aberration diagram, spherical aberration is illustrated with respect to e-line (indicated with a solid line) and g-line (indicated with a chain double-dashed line). Further, astigmatism is illustrated on a meridional image plane (meri) (indicated with a dotted line) with respect to e-line and a sagittal image plane (Sagi) (indicated with a solid line) with respect to e-line. In addition, lateral chromatic aberration is illustrated with respect to g-line (indicated with a chain double-dashed line). An F-number is represented by Fno and a half field angle is represented by ω. An image height is represented by Y. The lateral aberrations are illustrated on a meridional image plane (meri) (indicated with a solid line) with respect to e-line, and a sagittal image plane (Sagi) (indicated with a dotted line) with respect to the e-line, and g-line (indicated with a chain double-dashed line).

In the longitudinal aberration diagram in which the focal length range is in the standard state, spherical aberration, astigmatism, distortion, and lateral chromatic aberration are illustrated in scales of 0.5 mm, 0.5 mm, 5%, and 0.05 mm, respectively. The lateral aberration is illustrated in a scale of 0.05 mm. In the longitudinal aberration diagram in the extender switched state, spherical aberration, astigmatism, distortion, and lateral chromatic aberration are illustrated in scales of 1.0 mm, 1.0 mm, 5%, and 0.05 mm, respectively. Further, in the following embodiments, the wide angle end and the telephoto end are zoom positions where the second lens unit U2 for varying magnification is positioned at each end of the movable range on the optical axis with respect to the mechanism.

Next, features of individual embodiments are described. The zoom lens system of each embodiment includes, in order from the object side to the image side, a focus lens portion U1 including a lens unit for focusing, the zoom portion LZ including a lens unit for zooming, and the aperture stop SP for light amount adjustment. Further, the relay portion (fourth unit) U4 for imaging that does not move for zooming is disposed. The relay portion U4 includes the fourth-first unit U41 having negative optical power, the fourth-second unit U42, and the fourth-third unit U43 having positive optical power. In addition, the fourth-second unit U42 is constituted so as to be exchangeable with the fourth-fourth unit (extender) U44 that causes the focal length range of the entire system to shift to the long focal length side. In other words, the focal length of the entire system of the zoom lens system is longer (closer to the telephoto side) in the case where the fourth-fourth unit is inserted in place of the fourth-second unit in the optical path than in the case where the fourth-second unit is inserted (disposed) in the optical path. In addition, it is desired that one of the fourth-second unit and the fourth-fourth unit is disposed in the optical path, but it is possible that both of them are out of the optical path so that nothing is disposed between the fourth-first unit and the fourth-third unit in the optical path (or a transparent flat plate without optical power is disposed between the fourth-first unit and the fourth-third unit). The distance on the optical axis between the aperture stop SP and the last lens surface of the fourth-fourth unit U44 in the state in which the fourth-fourth unit (extender) U44 is inserted in the optical path is denoted by l_out. (Here, a distance on the optical axis refers to an actual length. The same is true in the following description.) A distance on the optical axis between the first lens surface and the last lens surface in the fourth-fourth unit U44 is denoted by l_ex. An aperture diameter in the opened state of the aperture stop SP is denoted by ea_sp. In this case, the following expressions (conditional expressions) are satisfied.

$$1.25 < l\_out/ea\_sp < 1.38 \quad (1)$$

$$0.40 < l\_ex/l\_out < 0.55 \quad (2)$$

The expression (1) defines a ratio of the distance on the optical axis between the aperture stop SP and the last lens surface of the fourth-fourth unit U44 to the aperture diameter of the aperture stop SP. By satisfying the expression (1), an interval between the aperture stop SP and the fourth-fourth unit U44 can be appropriately reduced so as to facilitate downsizing of the zoom lens system. If the ratio exceeds the upper limit of the expression (1), the interval between the aperture stop SP and the fourth-fourth unit U44 increases. As a result, it becomes difficult to downsize the zoom lens system. On the contrary, if the ratio falls below the lower limit of the expression (1), it is advantageous for downsizing the zoom lens system, but it becomes difficult to correct for aberration in the fourth-first unit U41 or the fourth-fourth unit U44. It is more preferred to set the range of the numerical value in the expression (1) as follows.

$$1.30 < l\_out/ea\_sp < 1.36 \quad (1a)$$

The expression (2) defines a ratio of thickness of the fourth-fourth unit U44 in the optical axis direction (the entire length of the fourth-fourth unit U44) to the distance on the optical axis between the aperture stop SP and the last lens surface of the fourth-fourth unit U44. By satisfying the expression (2), the interval for inserting and removing the fourth-fourth unit U44 into and from the optical path can be reduced. As a result, it is possible to facilitate downsizing of the zoom lens system. If the ratio exceeds the upper limit of the expression (2), the thickness of the fourth-fourth unit U44 becomes large. As a result, it becomes difficult to downsize the zoom lens system. On the contrary, if the ratio falls below the lower limit of the expression (2), the optical power of the lens constituting the fourth-fourth unit U44 becomes too large. As a result, it becomes difficult to correct for aberration. It is more preferred to set the range of the numerical value in the expression (2) as follows.

$$0.42 < l\_ex/l\_out < 0.53 \quad (2a)$$

In each embodiment, with the structure described above, the relay portion can be downsized while obtaining good optical performance. However, it is more preferred to satisfy one or more of the following conditions. In the state in which the fourth-second unit U42 is inserted in the optical path, an effective diameter of the first lens surface of the fourth-second unit U42 is denoted by ea1, and an effective diameter of the last lens surface of the fourth-second unit U42 is denoted by eak. In the state in which the fourth-fourth unit U44 is inserted in the optical path, an effective diameter of the first lens surface of the fourth-fourth unit U44 is denoted by ea1_ex, and an effective diameter of the last lens surface of the fourth-fourth unit U44 is denoted by eak_ex.

An effective diameter of the first lens surface of the fourth-first unit U41 is denoted by ea41. In the state in which the fourth-fourth unit U44 is inserted in the optical path, a distance on the optical axis between the aperture stop SP and the first lens surface of the fourth-fourth unit U44 is denoted by l_in. A focal length of the fourth-first unit U41 is denoted by f41. In the state in which the fourth-fourth unit U44 is inserted in the optical path, a combined focal length of the fourth-first unit U41 and the fourth-fourth unit U44 is denoted by f41_ex. In this case, it is more preferred that one or more of the following expressions be satisfied.

$$0.70 < ea1/eak < 0.92 \quad (3)$$

$$1.40 < ea1\_ex/eak\_ex < 1.87 \quad (4)$$

$$1.20 < ea41/l\_in < 1.70 \quad (5)$$

$$1.8 < f41/f41\_ex < 2.7 \quad (6)$$

Figure 13A:
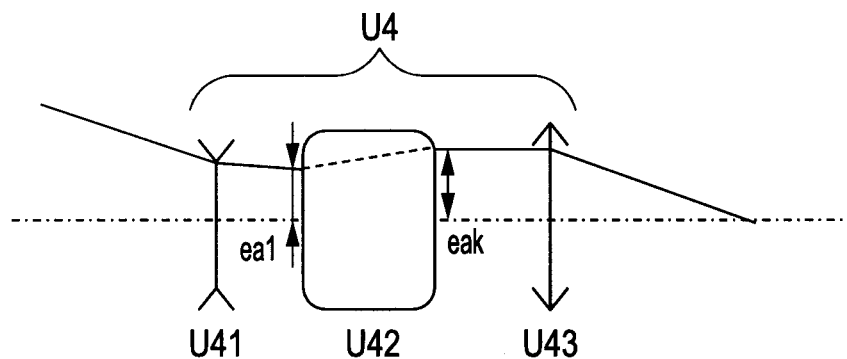
FIGS. 13A and 13B are optical path diagrams of a relay portion in the standard state and in the extender switched state, respectively.
Figure 13B:
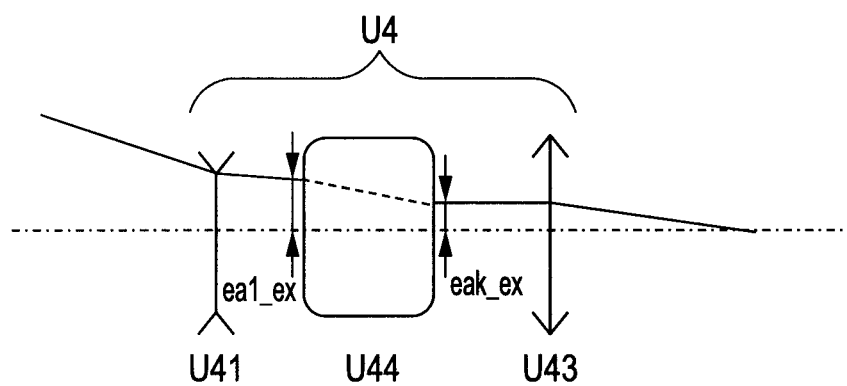
Figure 14A:
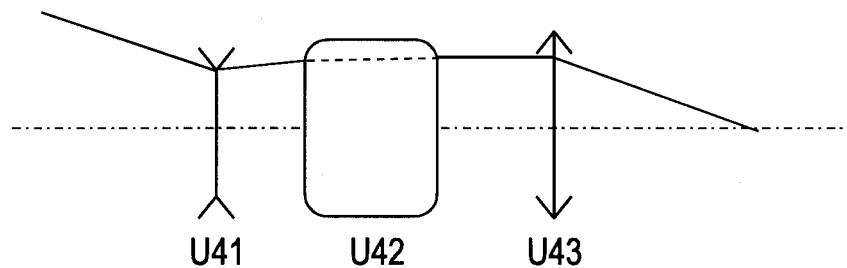
FIGS. 14A and 14B are optical path diagrams of the relay portion in the standard state and in the extender switched state, respectively.
Figure 14B:
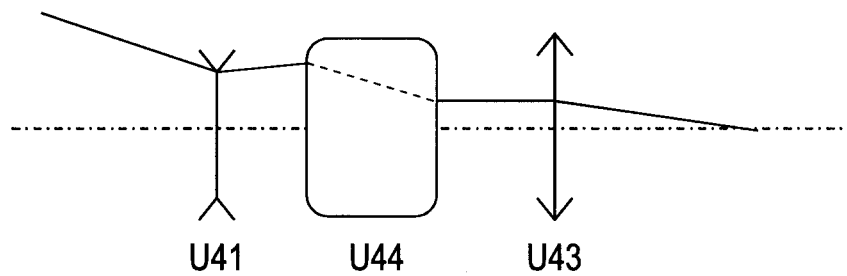
Figure 15A:
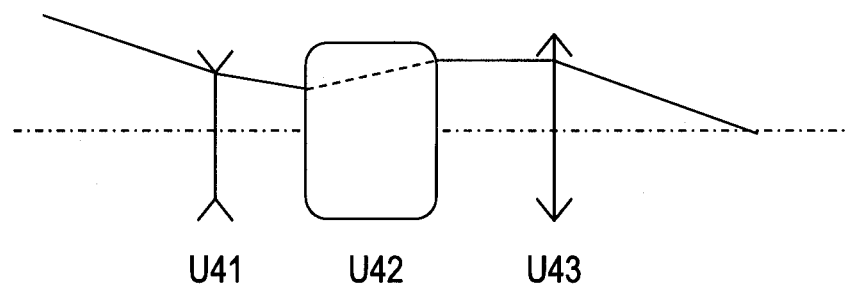
FIGS. 15A and 15B are optical path diagrams of the relay portion in the standard state and in the extender switched state, respectively.
Figure 15B:
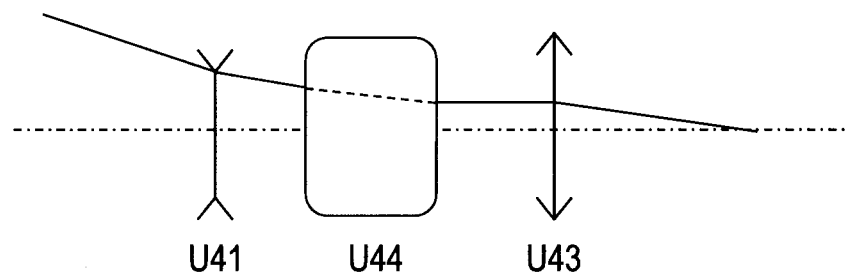

The expressions (3) and (4) are defined for decreasing the thickness (the entire length) of the fourth-fourth unit U44 in the optical axis direction while performing the aberration correction appropriately. If the ratios exceed the upper limits of the expressions (3) and (4), it is necessary to set the exit ray height from the fourth-fourth unit U44 to be smaller relative to the incident ray height to the fourth-fourth unit U44 therefore, optical power of the lens constituting the fourth-fourth unit U44 becomes large, which makes it difficult to correct for aberration. On the contrary, if the ratios fall below the lower limits of the expressions (3) and (4), optical power of the lens constituting the fourth-second unit U42 becomes large, which makes it difficult to correct for aberration in the standard state of the focal length range of the entire system. As illustrated in the schematic diagrams of FIGS. 13A and 13B, reduction of the thickness of the fourth-fourth unit U44 and the aberration correction are performed appropriately by setting the incident ray height and the exit ray height of the fourth-fourth unit U44 and the fourth-second unit U42 to appropriate values.

It is more preferred to set the ranges of the numerical values in the expressions (3) and (4) as follows.

$$0.72 < ea1/eak < 0.90 \quad (3a)$$

$$1.41 < ea1\_ex/eak\_ex < 1.85 \quad (4a)$$

If the ratio exceeds the upper limit of the expression (5), the fourth-first unit U41 for image stabilization becomes large. As a result, tracking performance of the image stabilization with respect to image blur is decreased. In addition, the drive mechanism becomes large. If the ratio falls below the lower limit of the expression (5), a distance on the optical axis between the aperture stop SP and the fourth-fourth unit U44 becomes large. As a result, it becomes difficult to downsize the zoom lens system. It is more preferred to set the range of the numerical value in the conditional expression (5) as follows.

$$1.29 < ea41/l\_in < 1.65 \quad (5a)$$

If the ratio exceeds the upper limit of the expression (6), a decentering amount of the fourth-first unit U41 for image stabilization increases during the image stabilization. Therefore, decentering aberration generated during the image stabilization is increased, and it becomes difficult to maintain optical performance during the image stabilization. On the contrary, if the ratio falls below the lower limit of the expression (6), power of the fourth-first unit U41 for image stabilization becomes large. As a result, it becomes difficult to correct for decentering coma, decentering field curvature, decentering lateral chromatic aberration, and the like generated by being decentered, which is not preferred. It is more preferred to set the expression (6) as follows.

$$1.95 < f41/f41\_ex < 2.60 \qquad (6a)$$

As described above, according to each embodiment, the focal length range of the entire system can be shifted to the long focal length side by forming the a partial system constituting a relay portion to be insertable into and removable from the optical path and by inserting the extender in place of the partial system, while maintaining high optical performance.

Hereinafter, specific structures of the individual embodiments of the zoom lens system according to the present invention are described. Embodiments 1 to 3 correspond to Numerical Embodiments 1 to 3.

The lens structures of the focus lens portion U1, the second lens unit U2 constituting the zoom portion LZ, and the third lens unit U3 are the same among Embodiments 1 to 3. The lens structures of the fourth-first unit U41 constituting the relay portion U4, the fourth-second unit U42, the fourth-third unit U43, and the fourth-fourth unit (extender) U44 are different among the embodiments. In Embodiment 1, the fourth unit U4 is constituted of the fourth-first unit U41 having negative optical power, the fourth-second unit U42, and the fourth-third unit U43 having positive optical power. The fourth-fourth unit U44 is inserted in place of the fourth-second unit U42 in the optical path after removing the fourth-second unit U42 from the optical path.

The fourth unit (relay portion) U4 of Embodiment 1 is described. The fourth unit U4 corresponds to the 28th surface to the 47th surface in Numerical Embodiment 1. The fourth-first unit U41 constituting the fourth unit U4 includes, in order from the object side to the image side, a cemented lens in which a negative lens G1 having a meniscus shape with a concave surface on the image side and a positive lens G2 having a meniscus shape with a convex surface on the object side are cemented, and a negative lens G3 having a meniscus shape with a concave surface on the object side.

The fourth-second unit U42 includes a cemented lens in which a negative lens G4 having a biconcave shape and a positive lens G5 having a meniscus shape with a convex surface on the object side are cemented, and a positive lens G6 having a plano-convex shape. In addition, the fourth-third unit U43 includes a positive lens G7 having a biconvex shape, a cemented lens in which a negative lens G8 having a biconcave shape and a positive lens G9 having a biconvex shape are cemented, and a cemented lens in which a positive lens G10 having a biconvex shape and a negative lens G11 having a meniscus shape with a concave surface on the object side are cemented. Further, a positive lens G12 having a biconvex shape is disposed.

The fourth-fourth unit U44 includes a front unit and a rear unit between which a largest air interval is disposed. The front unit of the fourth-fourth unit U44 includes a positive lens G13 having a biconvex shape, and a cemented lens in which a positive lens G14 having a meniscus shape with a convex surface on the object side and a negative lens G15 having a meniscus shape with a concave surface on the image side are cemented. The rear unit includes a cemented lens in which a negative lens G16 having a meniscus shape with a concave surface on the image side and a positive lens G17 having a meniscus shape with a convex surface on the object side are cemented, and a negative lens G18 having a meniscus shape with a concave surface on the image side. By exchanging the fourth-second unit U42 with the fourth-fourth unit U44, the focal length range of the entire system is shifted to the long focal length side by twice.

Corresponding values in the conditional expressions in this embodiment are shown in Table 1. This embodiment satisfies the expressions (1) to (4). By appropriately setting the lens structure of the relay portion, the zoom lens system having high optical performance and a small size is achieved, which includes the fourth-fourth unit (extender) U44 for shifting the focal length range of the zoom lens system to the long focal length side.

In Embodiment 2, the fourth unit U4 includes the fourth-first unit U41 having negative optical power, the fourth-second unit U42, and the fourth-third unit U43 having positive optical power. The fourth-first unit U41 has a function of moving in a direction perpendicular to the optical axis for image stabilization. The fourth-fourth unit U44 is inserted in place of the fourth-second unit U42 in the optical path after removing the fourth-second unit U42 from the optical path. The fourth unit (relay portion) U4 in Embodiment 2 is described. The fourth unit U4 corresponds to the 28th surface to the 48th surface in Numerical Embodiment 2. The fourth-first unit U41 constituting the fourth unit U4 includes, in order from the object side to the image side, a negative lens G1 having a biconcave shape, a positive lens G2 having a meniscus shape with a convex surface on the object side, and a negative lens G3 having a meniscus shape with a concave surface on the object side.

The fourth-second unit U42 includes a cemented lens in which a lens G4 having a biconcave shape and a positive lens G5 having a meniscus shape with a convex surface on the object side are cemented, and a positive lens G6 having a flat surface and a plano-convex shape. In addition, the fourth-third unit U43 includes a positive lens G7 having a biconvex shape, and a cemented lens in which a negative lens G8 having a biconcave shape and a positive lens G9 having a biconvex shape are cemented. Further, a cemented lens in which a positive lens G10 having a biconvex shape and a negative lens G11 having a meniscus shape with a concave surface on the object side are cemented, and a positive lens G12 having a biconvex shape are disposed.

The fourth-fourth unit U44 includes a front unit and a rear unit between which a largest air interval is disposed. The front unit of the fourth-fourth unit U44 includes a positive lens G13 having a biconvex shape, and a cemented lens in which a positive lens G14 having a biconvex shape and a negative lens G15 having a biconcave shape are cemented. The rear unit includes a negative lens G16 having a biconcave shape and a cemented lens in which a positive lens G17 having a meniscus shape with a convex surface on the object side and a negative lens G18 having a meniscus shape with a concave surface on the image side are cemented. By exchanging the fourth-second unit U42 with the fourth-fourth unit U44, the focal length range of the entire system is shifted to the long focal length side by twice.

Corresponding values in the conditional expressions in this embodiment are shown in Table 1. This embodiment satisfies the expressions (1) to (4). By appropriately setting the lens structure of the relay portion, the zoom lens system having high optical performance and a small size is achieved, which includes the fourth-fourth unit (extender) U44 for shifting the focal length range of the zoom lens system to the long focal length side. In addition, the zoom lens system of this embodiment satisfies expressions (5) and (6). Thus, high optical performance is realized also in the case where the image stabilization is performed, while the fourth-first unit U41 for image stabilization is small. Here, the effective diameter of the fourth-first unit U41 for image stabilization is a sum of a decentering amount of the image stabilization unit when the optical axis moves by 1.5 mm due to the image stabilization and an effective diameter in the case where the image stabilization is not performed.

In this embodiment, the image can be shifted by 1.07 mm when decentering by 1 mm in a direction perpendicular to the optical axis. Therefore, the decentering amount of the image stabilization unit when the optical axis is moved by 1.5 mm due to the image stabilization is determined to be 1.4 mm. Therefore, the effective diameter of the fourth-first unit U41 for image stabilization in this embodiment is determined to be a sum of the original effective diameter and 2.8 mm. The same concept is applied to numerical embodiments of Embodiment 2 and thereafter, for determining the effective diameter of the fourth-first unit U41 for image stabilization.

In Embodiment 3, the fourth unit U4 includes the fourth-first unit U41 having negative optical power, the fourth-second unit U42, and the fourth-third unit U43 having positive optical power. The fourth-first unit U41 has a function of moving in a direction perpendicular to the optical axis for image stabilization. The fourth-fourth unit U44 is inserted in place of the fourth-second unit U42 in the optical path after removing the fourth-second unit U42 from the optical path.

In the fourth-first unit U41 for image stabilization of this embodiment, the image can be shifted by 0.78 mm by decentering by 1 mm in a direction perpendicular to the optical axis.

Next, the fourth unit (relay portion) U4 of Embodiment 3 is described. The fourth unit U4 corresponds to the 28th surface to the 50th surface in Numerical Embodiment 3. The fourth-first unit U41 constituting the fourth unit U4 includes, in order from the object side to the image side, a negative lens G1 having a meniscus shape with a concave surface on the image side, a positive lens G2 having a meniscus shape with a convex surface on the object side, and a negative lens G3 having a biconcave shape. The fourth-second unit U42 includes a cemented lens in which a negative lens G4 having a biconcave shape and a positive lens G5 having a biconvex shape are cemented, and a positive lens G6 having a meniscus shape with a convex surface on the image side.

In addition, the fourth-third unit U43 includes a positive lens G7 having a biconvex shape, a positive lens G8 having a biconvex shape, and a cemented lens in which a negative lens G9 having a biconcave shape and a positive lens G10 having a biconvex shape are cemented. Further, the fourth-third unit U43 includes a cemented lens in which a positive lens G11 having a biconvex shape and a negative lens G12 having a meniscus shape with a concave surface on the object side are cemented, and a positive lens G13 having a biconvex shape. The fourth-fourth unit U44 includes a front unit and a rear unit between which a largest air interval is disposed. The front unit of the fourth-fourth unit U44 includes a positive lens G14 having a biconvex shape, and a cemented lens in which a positive lens G15 having a biconvex shape and a negative lens G16 having a biconcave shape are cemented. The rear unit is constituted of a cemented lens in which a positive lens G17 having a biconvex shape and a negative lens G18 having a biconcave shape are cemented. By exchanging the fourth-second unit U42 with the fourth-fourth unit U44, the focal length range of the entire system is shifted to the long focal length side by twice.

Corresponding values in the conditional expressions in this embodiment are shown in Table 1. This embodiment satisfies the conditional expressions (1) to (4). By appropriately setting the lens structure of the relay portion, the zoom lens system having high optical performance and a small size is achieved, which includes the fourth-fourth unit (extender) U44 for shifting the focal length range of the zoom lens system to the long focal length side. In addition, the zoom lens system of this embodiment satisfies the conditional expressions (5) and (6). Thus, high optical performance is realized also in the case where the image stabilization is performed, while the lens unit U41 for image stabilization is small.

The exemplary embodiments of the present invention are described above, but the present invention is not limited to those embodiments, which can be modified and changed variously within the range of the spirit thereof.

FIG. 12 is a schematic diagram illustrating an image pickup apparatus (television camera system) having the zoom lens system according to each exemplary embodiment as an image pickup optical system. Referring to FIG. 12, an image pickup apparatus 125 includes a zoom lens system 101, which is any one of the zoom lens systems according to Embodiments 1 to 3. The zoom lens system 101 may be detachably mounted on a camera body 124, to thereby constitute the image pickup apparatus 125.

The zoom lens system 101 includes a first unit (focus lens portion) F, a magnification varying portion (zoom portion) LZ, and a fourth unit for imaging (relay portion) R. The first unit F includes a lens unit for focusing. The magnification varying portion LZ includes a second unit which moves along the optical axis to vary magnification. In addition, the magnification varying unit LZ includes a third unit which moves along the optical axis to correct image plane variation due to magnification varying. The zoom lens system 101 includes an aperture stop SP. The fourth unit R includes a lens unit IE' (fourth-second unit U42) and a lens unit IE (fourth-fourth unit U44), which may enter into and exit from the optical path. The focal length range of the entire zoom lens system 101 may be shifted by exchanging the lens units IE' and IE. In addition, the zoom lens system 101 includes driving mechanisms 114 and 115, such as a helicoid or a cam, which drive the first unit F and the magnification varying portion Z, respectively, along the optical axis. The image pickup apparatus 125 includes motors (driving units) 116 to 118, which electrically drive the driving mechanisms 114 and 115 and the aperture stop SP, respectively. Detectors 119 to 121, such as an encoder, a potentiometer, or a photo-sensor, are configured to detect the position of the first unit F or the position of the magnification varying unit LZ on the optical axis, and the aperture diameter of the aperture stop SP. In addition, the camera body 124 includes a glass block 109, which is equivalent to an optical filter or a color separation prism provided within the camera body 124. Further, the camera body 124 includes a solid state image pickup element (photoelectrical conversion element) 110, such as a charge-coupled device (CCD) sensor or a complementary metal-oxide semiconductor (CMOS) sensor. The solid state image pickup element 110 is configured to receive an object image formed by the zoom lens system 101. Further, central processing units (CPUs) 111 and 122 control the driving of the camera body 124 and the zoom lens system 101, respectively. By applying the zoom lens system according to each embodiment of the present invention to a television camera as described above, an image pickup apparatus having high optical performance may be implemented.

Hereinafter, Numerical Embodiments 1 to 3, corresponding to Embodiments 1 to 3 of the present invention, are described. In each of the numerical embodiments, "i" represents the order of a surface from the object side, "ri" represents a radius of curvature of an i-th surface from the object side, "di" represents an interval between the i-th surface and the (i+1)th surface from the object side, and "ndi" and "vdi" respectively represent a refractive index and an Abbe number of the i-th optical material. "BF" represents an air-equivalent back focus. Three final surfaces are a glass block, such as a filter.

The aspheric shape is expressed in the following expression where an X axis corresponds to the optical axis, an H axis corresponds to an axis perpendicular to the optical axis, a travelling direction of light corresponds to a positive direction, "R" represents a paraxial radius of curvature, "k" represents a conic coefficient, and each of "A4", "A6", and "A8" represents an aspheric coefficient. Further, "e-Z" represents "$\times 10^{-Z}$".

$$X = \frac{H^2/R}{1+\sqrt{1-(1+k)(H/R)^2}} + A4H^4 + A6H^6 + A8H^8 \quad [\text{Eq. 1}]$$

Numerical embodiments of the extender portion are shown from the lens surface just before the object side to which the extender portion is inserted (lens surface closest to the image side in the fourth-first lens unit U41, which is, for example, R32 in Numerical Embodiment 1). In addition, Table 1 shows values corresponding to the conditional expressions in Numerical Embodiments 1 to 3.

<Numerical Embodiment 1>

(Focal length range under standard state)
Unit mm

Surface Data

| Surface Number | r | d | nd | vd | Effective diameter |
|---|---|---|---|---|---|
| 1 | 7000.000 | 6.00 | 1.83400 | 37.2 | 195.69 |
| 2 | 345.379 | 2.00 | | | 189.57 |
| 3 | 345.379 | 25.91 | 1.43387 | 95.1 | 190.61 |
| 4 | −527.375 | 20.74 | | | 191.16 |
| 5 | 331.921 | 18.73 | 1.43387 | 95.1 | 193.34 |
| 6 | −4082.422 | 0.25 | | | 192.86 |
| 7 | 264.903 | 19.29 | 1.43387 | 95.1 | 188.46 |
| 8 | 3887.712 | 0.25 | | | 187.25 |
| 9 | 171.964 | 16.12 | 1.43875 | 94.9 | 174.67 |
| 10 | 367.798 | (Variable) | | | 172.80 |
| 11 | 1547.347 | 2.00 | 2.00330 | 28.3 | 42.77 |
| 12 | 43.466 | 8.24 | | | 37.79 |
| 13 | −55.129 | 2.00 | 1.88300 | 40.8 | 37.77 |
| 14 | 63.246 | 9.63 | 1.92286 | 18.9 | 41.36 |
| 15 | −66.171 | 1.02 | | | 42.37 |
| 16 | −59.413 | 2.00 | 1.77250 | 49.6 | 42.43 |
| 17* | 2736.384 | (Variable) | | | 44.72 |
| 18 | 108.766 | 12.13 | 1.56907 | 71.3 | 81.41 |
| 19* | −3543.181 | 0.20 | | | 81.81 |
| 20 | 100.674 | 13.34 | 1.49700 | 81.5 | 83.34 |
| 21 | −613.181 | 0.20 | | | 82.78 |
| 22 | 103.700 | 2.50 | 1.84666 | 23.8 | 79.37 |
| 23 | 60.132 | 20.33 | 1.43875 | 94.9 | 74.98 |
| 24 | −268.844 | 0.20 | | | 73.52 |
| 25* | 201.189 | 5.73 | 1.43875 | 94.9 | 71.02 |
| 26 | −889.802 | (Variable) | | | 69.63 |
| 27 (Stop) | ∞ | 5.19 | | | 32.62 |
| 28 | 186.208 | 1.40 | 1.81600 | 46.6 | 29.05 |
| 29 | 25.515 | 5.51 | 1.84666 | 23.8 | 27.14 |
| 30 | 65.304 | 4.72 | | | 25.92 |
| 31 | −74.674 | 1.40 | 1.88300 | 40.8 | 24.90 |
| 32 | −336.961 | 7.27 | | | 24.76 |
| 33 | −23.629 | 1.80 | 1.77250 | 49.6 | 24.00 |
| 34 | 72.693 | 2.47 | 1.84666 | 23.8 | 26.53 |
| 35 | 304.414 | 3.03 | | | 27.10 |
| 36 | ∞ | 9.60 | 1.62041 | 60.3 | 29.30 |
| 37 | −33.451 | 5.48 | | | 31.93 |
| 38 | 968.789 | 6.61 | 1.48749 | 70.2 | 33.07 |
| 39 | −42.681 | 0.20 | | | 33.28 |
| 40 | −147.760 | 1.60 | 1.88300 | 40.8 | 32.40 |
| 41 | 38.666 | 10.22 | 1.49700 | 81.5 | 32.01 |
| 42 | −52.689 | 0.20 | | | 32.65 |
| 43 | 168.155 | 8.81 | 1.56732 | 42.8 | 32.33 |
| 44 | −28.418 | 1.60 | 1.88300 | 40.8 | 31.93 |
| 45 | −157.717 | 0.20 | | | 32.63 |
| 46 | 106.332 | 7.51 | 1.48749 | 70.2 | 32.74 |
| 47 | −42.361 | 14.00 | | | 32.52 |
| 48 | ∞ | 33.00 | 1.60859 | 46.4 | 60.00 |
| 49 | ∞ | 13.20 | 1.51633 | 64.2 | 60.00 |
| 50 | ∞ | (Variable) | | | 60.00 |
| Image plane | ∞ | | | | |

Aspherical surface data

Seventeenth surface

K = −2.53234e+004   A4 = −4.13015e−007   A6 = −2.14627e−010
A8 = 2.26588e−013

Nineteenth surface

K = 5.22565e+003   A4 = 8.81676e−008   A6 = 1.58180e−012
A8 = 6.14872e−015

Twenty-fifth surface

K = −9.48244e+000   A4 = −7.57187e−007   A6 = −1.54476e−010
A8 = 2.42122e−014

Various data
Zoom ratio 100.00

| | Wide angle | Intermediate | Telephoto |
|---|---|---|---|
| Focal length | 9.30 | 94.44 | 929.98 |
| F-number | 1.85 | 1.85 | 4.90 |
| Field angle | 30.60 | 3.33 | 0.34 |
| Image height | 5.50 | 5.50 | 5.50 |
| Total lens length | 617.99 | 617.99 | 617.99 |
| BF | 11.99 | 11.99 | 11.99 |
| d10 | 3.07 | 141.07 | 176.64 |
| d17 | 266.10 | 100.56 | 1.96 |
| d26 | 3.00 | 30.54 | 93.57 |
| d50 | 11.99 | 11.99 | 11.99 |
| Entrance pupil position | 124.58 | 996.17 | 11114.47 |
| Exit pupil position | 227.25 | 227.25 | 227.25 |
| Front principal point position | 134.28 | 1132.04 | 16062.25 |
| Rear principal point position | 2.69 | −82.45 | −917.99 |

Zoom lens unit data

| Unit | First surface | Focal length | Lens structure length | Front principal point position | Rear principal point position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 46.22 | 145.02 | 59.24 | 16.83 |

(Focal length range under standard state)
Unit mm (Extender portion)

| | | | | |
|---|---|---|---|---|
| 32 | −336.961 | 3.50 | | 24.76 |
| 33 | 65.994 | 2.75 | 1.48749 | 70.2 | 23.90 |
| 34 | −449.738 | 0.40 | | 23.53 |
| 35 | 17.296 | 5.07 | 1.64000 | 60.1 | 21.81 |
| 36 | 197.534 | 0.90 | 1.84666 | 23.8 | 20.59 |
| 37 | 18.033 | 5.51 | | 18.30 |
| 38 | 182.659 | 0.80 | 1.78800 | 47.4 | 17.05 |
| 39 | 11.672 | 3.59 | 1.80809 | 22.8 | 16.07 |
| 40 | 35.812 | 1.13 | | 15.72 |
| 41 | 97.623 | 1.00 | 1.88300 | 40.8 | 15.64 |
| 42 | 43.673 | 5.00 | | 15.44 |

<Numerical Embodiment 2>

(Focal length range under standard state)
Unit mm

Surface Data

| Surface Number | r | d | nd | vd | Effective diameter |
|---|---|---|---|---|---|
| 1 | 7000.000 | 6.00 | 1.83400 | 37.2 | 195.69 |
| 2 | 345.379 | 2.00 | | | 189.57 |
| 3 | 345.379 | 25.91 | 1.43387 | 95.1 | 190.61 |
| 4 | −527.375 | 20.74 | | | 191.16 |
| 5 | 331.921 | 18.73 | 1.43387 | 95.1 | 193.34 |
| 6 | −4082.422 | 0.25 | | | 192.86 |
| 7 | 264.903 | 19.29 | 1.43387 | 95.1 | 188.46 |
| 8 | 3887.712 | 0.25 | | | 187.25 |
| 9 | 171.964 | 16.12 | 1.43875 | 94.9 | 174.67 |
| 10 | 367.798 | (Variable) | | | 172.80 |
| 11 | 1547.347 | 2.00 | 2.00330 | 28.3 | 42.77 |
| 12 | 43.466 | 8.24 | | | 37.79 |
| 13 | −55.129 | 2.00 | 1.88300 | 40.8 | 37.77 |
| 14 | 63.246 | 9.63 | 1.92286 | 18.9 | 41.36 |
| 15 | −66.171 | 1.02 | | | 42.37 |
| 16 | −59.413 | 2.00 | 1.77250 | 49.6 | 42.43 |
| 17* | 2736.384 | (Variable) | | | 44.72 |
| 18 | 108.766 | 12.13 | 1.56907 | 71.3 | 81.41 |
| 19* | −3543.181 | 0.20 | | | 81.81 |
| 20 | 100.674 | 13.34 | 1.49700 | 81.5 | 83.34 |
| 21 | −613.181 | 0.20 | | | 82.78 |
| 22 | 103.700 | 2.50 | 1.84666 | 23.8 | 79.37 |
| 23 | 60.132 | 20.33 | 1.43875 | 94.9 | 74.98 |
| 24 | −268.844 | 0.20 | | | 73.52 |
| 25* | 201.189 | 5.73 | 1.43875 | 94.9 | 71.02 |
| 26 | −889.802 | (Variable) | | | 69.63 |
| 27 (Stop) | ∞ | 4.50 | | | 32.62 |
| 28 | −218.375 | 1.00 | 1.81600 | 46.6 | 32.95 |
| 29 | 34.790 | 0.20 | | | 31.73 |
| 30 | 30.180 | 4.33 | 1.84666 | 23.8 | 31.95 |
| 31 | 82.724 | 4.91 | | | 31.30 |
| 32 | −60.480 | 1.00 | 1.88300 | 40.8 | 30.55 |
| 33 | −307.193 | 6.38 | | | 30.64 |
| 34 | −67.453 | 1.80 | 1.75500 | 52.3 | 27.78 |
| 35 | 62.254 | 4.41 | 1.80518 | 25.4 | 28.64 |
| 36 | 693.124 | 3.03 | | | 29.08 |
| 37 | ∞ | 11.21 | 1.62041 | 60.3 | 30.00 |
| 38 | −104.615 | 6.53 | | | 31.93 |
| 39 | 94.562 | 8.62 | 1.48749 | 70.2 | 33.07 |
| 40 | −48.439 | 0.20 | | | 32.92 |
| 41 | −68.383 | 1.60 | 1.88300 | 40.8 | 32.43 |
| 42 | 49.733 | 9.12 | 1.48749 | 70.2 | 32.51 |
| 43 | −36.756 | 0.20 | | | 33.02 |
| 44 | 310.864 | 7.63 | 1.56732 | 42.8 | 32.19 |
| 45 | −28.174 | 1.60 | 1.88300 | 40.8 | 31.83 |
| 46 | −140.085 | 0.20 | | | 32.41 |
| 47 | 53.439 | 7.71 | 1.48749 | 70.2 | 32.37 |
| 48 | −74.444 | 14.00 | | | 31.63 |
| 49 | ∞ | 33.00 | 1.60859 | 46.4 | 60.00 |
| 50 | ∞ | 13.20 | 1.51633 | 64.2 | 60.00 |
| 51 | ∞ | (Variable) | | | 60.00 |
| Image plane | ∞ | | | | |

Aspherical surface data

Seventeenth surface

K = −2.53234e+004    A4 = −4.13015e−007    A6 = −2.14627e−010
A8 = 2.26588e−013

Nineteenth surface

K = 5.22565e+003    A4 = 8.81676e−008    A6 = 1.58180e−012
A8 = 6.14872e−015

Twenty-fifth surface

K = −9.48244e+000    A4 = −7.57187e−007    A6 = −1.54476e−010
A8 = 2.42122e−014

Various data
Zoom ratio 100.00

| | Wide angle | Intermediate | Telephoto |
|---|---|---|---|
| Focal length | 9.30 | 94.44 | 929.98 |
| F-number | 1.85 | 1.85 | 4.90 |
| Field angle | 30.60 | 3.33 | 0.34 |
| Image height | 5.50 | 5.50 | 5.50 |
| Total lens length | 619.37 | 619.37 | 619.37 |
| BF | 12.03 | 12.03 | 12.03 |
| d10 | 3.07 | 141.07 | 176.64 |
| d17 | 266.10 | 100.56 | 1.96 |
| d26 | 3.00 | 30.54 | 93.57 |
| d51 | 12.03 | 12.03 | 12.03 |
| Entrance pupil position | 124.58 | 996.17 | 11114.47 |
| Exit pupil position | 341.49 | 341.49 | 341.49 |
| Front principal point position | 134.14 | 1117.68 | 14669.48 |
| Rear principal point position | 2.73 | −82.41 | −917.96 |

Zoom lens unit data

| Unit | First surface | Focal length | Lens structure length | Front principal point position | Rear principal point position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 50.37 | 146.37 | 59.63 | 17.29 |

(Extender portion)

| | | | | | |
|---|---|---|---|---|---|
| 33 | −307.193 | 5.05 | | | 30.64 |
| 34 | 368.172 | 3.11 | 1.75500 | 52.3 | 27.78 |
| 35 | −52.809 | 0.20 | | | 27.74 |
| 36 | 18.456 | 6.27 | 1.50137 | 56.4 | 24.33 |
| 37 | −633.309 | 0.90 | 1.69895 | 30.1 | 22.93 |
| 38 | 23.532 | 8.99 | | | 20.41 |
| 39 | −44.487 | 0.70 | 1.60311 | 60.6 | 16.80 |
| 40 | 46.696 | 0.39 | | | 16.32 |
| 41 | 41.378 | 1.75 | 1.80809 | 22.8 | 16.26 |
| 42 | 659.923 | 0.70 | 1.81600 | 46.6 | 16.01 |
| 43 | 25.831 | 5.31 | | | 15.55 |

<Numerical Embodiment 3>

(Focal length range under standard state)
Unit mm

Surface Data

| Surface Number | r | d | nd | vd | Effective diameter |
|---|---|---|---|---|---|
| 1 | 7000.000 | 6.00 | 1.83400 | 37.2 | 195.69 |
| 2 | 345.379 | 2.00 | | | 189.57 |
| 3 | 345.379 | 25.91 | 1.43387 | 95.1 | 190.61 |
| 4 | −527.375 | 20.74 | | | 191.16 |
| 5 | 331.921 | 18.73 | 1.43387 | 95.1 | 193.34 |
| 6 | −4082.422 | 0.25 | | | 192.86 |
| 7 | 264.903 | 19.29 | 1.43387 | 95.1 | 188.46 |
| 8 | 3887.712 | 0.25 | | | 187.25 |
| 9 | 171.964 | 16.12 | 1.43875 | 94.9 | 174.67 |
| 10 | 367.798 | (Variable) | | | 172.80 |
| 11 | 1547.347 | 2.00 | 2.00330 | 28.3 | 42.77 |
| 12 | 43.466 | 8.24 | | | 37.79 |
| 13 | −55.129 | 2.00 | 1.88300 | 40.8 | 37.77 |
| 14 | 63.246 | 9.63 | 1.92286 | 18.9 | 41.36 |
| 15 | −66.171 | 1.02 | | | 42.37 |
| 16 | −59.413 | 2.00 | 1.77250 | 49.6 | 42.43 |
| 17* | 2736.384 | (Variable) | | | 44.72 |
| 18 | 108.766 | 12.13 | 1.56907 | 71.3 | 81.41 |
| 19* | −3543.181 | 0.20 | | | 81.81 |
| 20 | 100.674 | 13.34 | 1.49700 | 81.5 | 83.34 |
| 21 | −613.181 | 0.20 | | | 82.78 |
| 22 | 103.700 | 2.50 | 1.84666 | 23.8 | 79.37 |
| 23 | 60.132 | 20.33 | 1.43875 | 94.9 | 74.98 |
| 24 | −268.844 | 0.20 | | | 73.52 |
| 25* | 201.189 | 5.73 | 1.43875 | 94.9 | 71.02 |
| 26 | −889.802 | (Variable) | | | 69.63 |
| 27 (Stop) | ∞ | 6.50 | | | 32.62 |
| 28 | 211.142 | 1.00 | 1.88300 | 40.8 | 32.10 |
| 29 | 28.490 | 0.19 | | | 30.61 |
| 30 | 25.313 | 5.25 | 1.78470 | 26.3 | 30.76 |
| 31 | 126.175 | 4.75 | | | 29.89 |
| 32 | −58.883 | 1.00 | 1.88300 | 40.8 | 28.18 |
| 33 | 907.627 | 5.87 | | | 27.95 |
| 34 | −25.410 | 1.20 | 1.81600 | 46.6 | 23.67 |
| 35 | 38.551 | 3.56 | 1.71736 | 29.5 | 26.05 |
| 36 | −774.755 | 3.03 | | | 26.57 |
| 37 | −53.480 | 10.54 | 1.63930 | 44.9 | 27.60 |
| 38 | −24.309 | 6.41 | | | 31.92 |
| 39 | 79.464 | 4.00 | 1.58144 | 40.8 | 33.08 |
| 40 | −334.906 | 0.20 | | | 32.88 |
| 41 | 106.018 | 4.00 | 1.51742 | 52.4 | 32.46 |
| 42 | −196.825 | 1.00 | | | 31.93 |
| 43 | −125.253 | 1.60 | 1.83481 | 42.7 | 31.62 |
| 44 | 26.494 | 7.83 | 1.49700 | 81.5 | 30.60 |
| 45 | −542.191 | 0.20 | | | 31.02 |
| 46 | 79.746 | 8.85 | 1.51633 | 64.1 | 31.43 |
| 47 | −25.971 | 1.60 | 1.88300 | 40.8 | 31.42 |
| 48 | −75.619 | 0.20 | | | 32.85 |
| 49 | 214.975 | 7.42 | 1.48749 | 70.2 | 33.22 |
| 50 | −33.382 | 14.00 | | | 33.32 |
| 51 | ∞ | 33.00 | 1.60859 | 46.4 | 60.00 |
| 52 | ∞ | 13.20 | 1.51633 | 64.2 | 60.00 |
| 53 | ∞ | (Variable) | | | 60.00 |
| Image plane | ∞ | | | | |

Aspherical surface data

Seventeenth surface

K = −2.53234e+004   A4 = −4.13015e−007   A6 = −2.14627e−010
A8 = 2.26588e−013

Nineteenth surface

K = 5.22565e+003   A4 = 8.81676e−008   A6 = 1.58180e−012
A8 = 6.14872e−015

Twenty-fifth surface

K = −9.48244e+000   A4 = −7.57187e−007   A6 = −1.54476e−010
A8 = 2.42122e−014

Various data
Zoom ratio 100.00

| | Wide angle | Intermediate | Telephoto |
|---|---|---|---|
| Focal length | 9.30 | 94.44 | 930.00 |
| F-number | 1.85 | 1.85 | 4.90 |
| Field angle | 30.60 | 3.33 | 0.34 |
| Image height | 5.50 | 5.50 | 5.50 |
| Total lens length | 619.39 | 619.39 | 619.39 |
| BF | 12.00 | 12.00 | 12.00 |
| d10 | 3.07 | 141.07 | 176.64 |
| d17 | 266.10 | 100.56 | 1.96 |
| d26 | 3.00 | 30.54 | 93.57 |
| d53 | 12.00 | 12.00 | 12.00 |
| Entrance pupil position | 124.58 | 996.17 | 11114.47 |
| Exit pupil position | 191.58 | 191.58 | 191.58 |
| Front principal point position | 134.36 | 1140.28 | 16860.61 |
| Rear principal point position | 2.70 | −82.44 | −918.00 |

Zoom lens unit data

| Unit | First surface | Focal length | Lens structure length | Front principal point position | Rear principal point position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 44.15 | 146.41 | 59.04 | 16.62 |

(Extender portion)

| 33 | 907.627 | 5.87 | | | 27.95 |
|---|---|---|---|---|---|
| 34 | 30.270 | 4.73 | 1.57135 | 53.0 | 22.81 |
| 35 | −125.330 | 0.20 | | | 22.01 |
| 36 | 160.629 | 2.95 | 1.56732 | 42.8 | 21.21 |
| 37 | −52.266 | 0.90 | 1.72825 | 28.5 | 20.37 |
| 38 | 35.753 | 7.40 | | | 19.01 |
| 39 | 715.123 | 1.76 | 1.92286 | 18.9 | 16.91 |
| 40 | −51.061 | 0.80 | 1.72916 | 54.7 | 16.72 |
| 41 | 26.436 | 6.00 | | | 16.04 |

TABLE 1

| Conditional Expression No. | Conditional Expression | Numerical Embodiment 1 | Numerical Embodiment 2 | Numerical Embodiment 3 |
|---|---|---|---|---|
| (1) | i_out/ea_sp | 1.31 | 1.35 | 1.33 |
| (2) | i_ex/i_out | 0.49 | 0.52 | 0.43 |
| (3) | ea1/eak | 0.75 | 0.87 | 0.74 |
| (4) | ea1_ex/eak_ex | 1.55 | 1.79 | 1.42 |
| (5) | ea41/i_in | — | 1.57 | 1.31 |
| (6) | f41/f41_ex | — | 1.99 | 2.24 |

According to the embodiments of the present invention, by appropriately setting lens structures of the relay portion and the extender, it is possible to obtain a zoom lens system which is capable of obtaining high optical performance with ease in the standard state and in the extender switched state while an increase in the entire length of the relay portion is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-167032, filed Jul. 26, 2010, which is hereby incorporated by reference herein in its entirety.

What is claimed is:

1. A zoom lens system, comprising, in order from an object side to an image side:
a focus lens portion;
a zoom portion including a lens unit that moves for zooming;
an aperture stop for light amount adjustment;
a relay portion that does not move for zooming; and
wherein:
the relay portion comprises:
a negative lens unit having negative optical power,
a positive lens unit disposed at the image side with respect to the negative lens unit, and having a positive optical power, and
an insertable unit that is insertable into an optical path between the negative lens unit and the positive lens unit, and shifts a focal length range of an entire system to a long focal length side by being inserted into the optical path, and
wherein
when, an effective diameter of a lens surface closest to the object side of the negative lens unit is denoted by ea41, a distance from the aperture stop to a lens surface of the insertable unit closest to the object side on the optical path when the insertable unit is inserted into the optical path is denoted by l_in, a focal length of the negative lens unit is denoted by f41, a combined focal length of the negative lens unit and the insertable unit when the insertable unit is inserted into the optical path is denoted by f41_ex, the following expressions are satisfied: insertable $1.29 < ea41/l\_in < 1.65$; and $1.8 < f41/f41\_ex < 2.7$.

2. A zoom lens system according to claim 1, wherein the negative lens unit is movable in a direction perpendicular to the optical axis.

3. A zoom lens system according to claim 1, wherein the zoom portion comprises a first zooming unit moving when zooming and having a negative optical power, and a second zooming unit moving when zooming and having a positive optical power.

4. An image pickup apparatus, comprising:
a zoom lens system; and
a solid state image pickup element for receiving an image formed by the zoom lens system, wherein:
the zoom lens system comprises, in order from an object side to the solid state image pickup element image side:
a focus lens portion;
a zoom portion including a lens unit that moves for zooming;
an aperture stop for light amount adjustment,
a relay portion that does not move for zooming; and
wherein:
the relay portion comprises:
a negative lens unit having negative optical power,
a positive lens unit disposed at the image side with respect to the negative lens unit, and having a positive optical power, and
an insertable unit that is insertable into an optical path between the negative lens unit and the positive lens unit, and shifts a focal length range of an entire system to a long focal length side by being inserted into the optical path, and
wherein when an effective diameter of a lens surface closest to the object side of the negative lens unit is denoted by ea41, a distance from the aperture stop to a lens surface of the insertable unit closest to the object side on the optical path when the insertable unit is inserted into the optical path is denoted by l_in, a focal length of the negative lens unit is denoted by f41, a combined focal length of the negative lens unit and the insertable unit when the insertable unit is inserted into the optical path is denoted by f41_ex, the following expressions are satisfied:

$1.29 < ea41/l\_in < 1.65$; and $1.8 < f41/f41\_ex < 2.7$.

5. A zoom lens system, comprising, in order from an object side to an image side:
a focus lens portion;
a zoom portion including a lens unit that moves for zooming;
an aperture stop for light amount adjustment,
a relay portion that does not move for zooming; and
wherein:
the relay portion comprises:
a first unit having a negative optical power,
a third unit disposed at the image side with respect to the first unit, and having a positive optical power,
a second unit insertable into an optical path between the first unit and the third unit, and which is removable from the optical path, and
a fourth unit that is insertable into the optical path between the first unit and the third unit, in a state in which the second unit is removed from the optical path, and shifts a focal length range of an entire system to a long focal length side by being inserted into the optical path, and
wherein when an effective diameter of a lens surface closest to the object side of the first unit is denoted by ea41, a distance from the aperture stop to a lens surface of the fourth unit closest to the object side on the optical path when the fourth unit is inserted into the optical path is denoted by l_in, a focal length of the first unit is denoted by f41, a combined focal length of the first unit and the fourth unit when the fourth unit is inserted into the optical path is denoted by f41_ex, the following expressions are satisfied:

$1.29 < ea41/l\_in < 1.65$; and $1.8 < f41/f41\_ex < 2.7$.

6. A zoom lens system according to claim 5, wherein when, an effective diameter of a lens surface of the second unit closest to the object side when the second unit is inserted into the optical path is denoted by ea1, an effective diameter of a lens surface of the second unit closest to the image side is denoted by eak, an effective diameter of a lens surface of the fourth unit closest to the object side when the fourth unit is inserted into the optical path is denoted by ea1_ex, and an effective diameter of a lens surface of the fourth unit closest to the image side is denoted by eak_ex, the following expressions are satisfied:

$0.70 < ea1/eak < 0.92$; and $1.40 < ea1\_ex/eak\_ex < 1.87$.

7. A zoom lens system according to claim 5, wherein the first unit is movable in a direction perpendicular to the optical axis.

8. A zoom lens system according to claim 5, wherein the zoom portion comprises a first zooming unit moving when zooming and having a negative optical power, and a second zooming unit moving when zooming and having a positive optical power.

9. An image pickup apparatus, comprising:
a zoom lens system; and
a solid state image pickup element for receiving an image formed by the zoom lens system, wherein:
the zoom lens system comprises, in order from an object side to the solid state image pickup element image side:
a focus lens portion;
a zoom portion including a lens unit that moves for zooming;
an aperture stop for light amount adjustment;
a relay portion that does not move for zooming; and
wherein:
the relay portion comprises:
a first unit having a negative optical power,
a third unit disposed at the image side with respect to the first unit, and having a positive optical power,
a second unit insertable into an optical path between the first unit and the third unit, and which is removable from the optical path, and
a fourth unit that is insertable into the optical path between the first unit and the third unit, in a state in which the second unit is removed from the optical path, and shifts a focal length range of an entire system to a long focal length side by being inserted into the optical path, and
wherein when an effective diameter of a lens surface closest to the object side of the first unit is denoted by ea41, a distance from the aperture stop to a lens surface of the fourth unit closest to the object side on the optical path when the fourth unit is inserted into the optical path is denoted by l_in, a focal length of the first unit is denoted by f41, a combined focal length of the first unit and the fourth unit when the fourth unit is inserted into the optical path is denoted by f41_ex, the following expressions are satisfied:

$1.29 < ea41/l\_in < 1.65$; and $1.8 < f41/f41\_ex < 2.7$.

* * * * *